US008928621B2

(12) United States Patent
Ciesla et al.

(10) Patent No.: US 8,928,621 B2
(45) Date of Patent: Jan. 6, 2015

(54) USER INTERFACE SYSTEM AND METHOD

(75) Inventors: Craig Michael Ciesla, Mountain View, CA (US); Micah B Yairi, Daly City, CA (US); Nathaniel Mark Saal, Palo Alto, CA (US)

(73) Assignee: Tactus Technology, Inc., Fremont, CA (US)

( * ) Notice: Subject to any disclaimer, the term of this patent is extended or adjusted under 35 U.S.C. 154(b) by 261 days.

(21) Appl. No.: 13/278,138

(22) Filed: Oct. 20, 2011

(65) Prior Publication Data

US 2012/0193211 A1  Aug. 2, 2012

Related U.S. Application Data

(60) Provisional application No. 61/405,149, filed on Oct. 20, 2010.

(51) Int. Cl.
*G06F 3/041* (2006.01)
*G06F 3/02* (2006.01)
*G01L 1/02* (2006.01)

(52) U.S. Cl.
CPC .............. *G06F 3/041* (2013.01); *G06F 3/0202* (2013.01); *G06F 3/0416* (2013.01); *G01L 1/02* (2013.01); *H01H 2211/002* (2013.01); *H01H 2221/038* (2013.01)
USPC ............................ 345/174; 345/173; 345/177

(58) Field of Classification Search
CPC ....... G06F 3/044; G06F 3/0414; G06F 3/016; G06F 3/0202; G06F 2203/04809; G06F 3/041; G06F 1/1684; G06F 2203/04103; G06F 3/03547; G06F 3/045; G06F 2203/04104; G06F 2203/04106; G06F 2203/04113; G06F 3/0488; G06F 3/04883
USPC .................. 200/81 H; 345/173–178
See application file for complete search history.

(56) References Cited

U.S. PATENT DOCUMENTS 3,659,354 A    5/1972    Sutherland
3,759,108 A    9/1973    Borom et al.
(Continued)

FOREIGN PATENT DOCUMENTS

CN    1260525 A    7/2000
JP    10255106    9/1998
(Continued)

OTHER PUBLICATIONS

Optical Society of America, Optics Express; vol. 12, No. 11. May 31, 2004, 7 Pages, Jeong, Ki-Hun , et al. "Tunable Microdoublet Lens Array".

(Continued)

*Primary Examiner* — Amare Mengistu
*Assistant Examiner* — Gloryvid Figueroa-Gibson
(74) *Attorney, Agent, or Firm* — Jeffrey Schox; Peter Miller

(57) ABSTRACT

One embodiment of the user interface system comprises: A tactile layer defining a tactile surface touchable by a user and plurality of deformable regions operable between a retracted state, wherein the deformable regions are flush with an undeformable region of the tactile layer; and an expanded state, wherein the deformable regions are proud of the undeformable region. A substrate joined to the undeformable region and defining a fluid port per deformable region and a fluid channel. A displacement device displacing the fluid through the fluid channel and the fluid ports to transition the deformable regions from the retracted state to the expanded state. A first and a second pressure sensor detecting changes in fluid pressure within the fluid due to a force applied to a particular deformable region. A processor determining the particular deformable region to be location of the input force based upon the detected fluid pressure changes.

27 Claims, 6 Drawing Sheets

(56) References Cited

U.S. PATENT DOCUMENTS

| | | |
|---|---|---|
| 3,780,236 A | 12/1973 | Gross |
| 3,818,487 A | 6/1974 | Brody et al. |
| 4,109,118 A | 8/1978 | Kley |
| 4,209,819 A | 6/1980 | Seignemartin |
| 4,290,343 A | 9/1981 | Gram |
| 4,307,268 A | 12/1981 | Harper |
| 4,467,321 A | 8/1984 | Volnak |
| 4,477,700 A | 10/1984 | Balash et al. |
| 4,517,421 A | 5/1985 | Margolin |
| 4,700,025 A | 10/1987 | Hatayama et al. |
| 4,920,343 A | 4/1990 | Schwartz |
| 5,194,852 A | 3/1993 | More et al. |
| 5,195,659 A | 3/1993 | Eiskant |
| 5,212,473 A | 5/1993 | Louis |
| 5,286,199 A | 2/1994 | Kipke |
| 5,412,189 A | 5/1995 | Cragun |
| 5,459,461 A | 10/1995 | Crowley et al. |
| 5,496,174 A | 3/1996 | Garner |
| 5,666,112 A | 9/1997 | Crowley et al. |
| 5,717,423 A | 2/1998 | Parker |
| 5,729,222 A | 3/1998 | Iggulden et al. |
| 5,742,241 A | 4/1998 | Crowley et al. |
| 5,754,023 A | 5/1998 | Roston et al. |
| 5,766,013 A | 6/1998 | Vuyk |
| 5,767,839 A | 6/1998 | Rosenberg |
| 5,835,080 A | 11/1998 | Beeteson et al. |
| 5,889,236 A | 3/1999 | Gillespie et al. |
| 5,943,043 A | 8/1999 | Furuhata et al. |
| 5,977,867 A | 11/1999 | Blouin |
| 5,982,304 A | 11/1999 | Selker et al. |
| 6,067,116 A | 5/2000 | Yamano et al. |
| 6,154,198 A | 11/2000 | Rosenberg |
| 6,154,201 A | 11/2000 | Levin et al. |
| 6,160,540 A | 12/2000 | Fishkin et al. |
| 6,169,540 B1 | 1/2001 | Rosenberg et al. |
| 6,218,966 B1 | 4/2001 | Goodwin et al. |
| 6,243,074 B1 | 6/2001 | Fishkin et al. |
| 6,243,078 B1 | 6/2001 | Rosenberg |
| 6,268,857 B1 | 7/2001 | Fishkin et al. |
| 6,271,828 B1 | 8/2001 | Rosenberg et al. |
| 6,278,441 B1 | 8/2001 | Gouzman et al. |
| 6,300,937 B1 | 10/2001 | Rosenberg |
| 6,354,839 B1 | 3/2002 | Schmidt et al. |
| 6,356,259 B1 | 3/2002 | Maeda et al. |
| 6,359,572 B1 | 3/2002 | Vale |
| 6,366,272 B1 | 4/2002 | Rosenberg et al. |
| 6,369,803 B2 | 4/2002 | Brisebois et al. |
| 6,414,671 B1 | 7/2002 | Gillespie et al. |
| 6,437,771 B1 | 8/2002 | Rosenberg et al. |
| 6,462,294 B2 | 10/2002 | Davidson et al. |
| 6,469,692 B2 | 10/2002 | Rosenberg |
| 6,486,872 B2 | 11/2002 | Rosenberg et al. |
| 6,498,353 B2 | 12/2002 | Nagle et al. |
| 6,509,892 B1 | 1/2003 | Cooper et al. |
| 6,529,183 B1 | 3/2003 | Maclean et al. |
| 6,573,844 B1 | 6/2003 | Venolia et al. |
| 6,636,202 B2 | 10/2003 | Ishmael, Jr. et al. |
| 6,639,581 B1 | 10/2003 | Moore et al. |
| 6,655,788 B1 | 12/2003 | Freeman |
| 6,657,614 B1 | 12/2003 | Ito et al. |
| 6,681,031 B2 | 1/2004 | Cohen et al. |
| 6,686,911 B1 | 2/2004 | Levin et al. |
| 6,697,086 B2 | 2/2004 | Rosenberg et al. |
| 6,703,924 B2 | 3/2004 | Tecu et al. |
| 6,788,295 B1 | 9/2004 | Inkster |
| 6,819,316 B2 | 11/2004 | Schulz et al. |
| 6,850,222 B1 | 2/2005 | Rosenberg |
| 6,861,961 B2 | 3/2005 | Sandbach et al. |
| 6,877,986 B2 | 4/2005 | Fournier et al. |
| 6,881,063 B2 | 4/2005 | Yang |
| 6,930,234 B2 | 8/2005 | Davis |
| 6,937,225 B1 | 8/2005 | Kehlstadt et al. |
| 6,975,305 B2 | 12/2005 | Yamashita |
| 6,979,164 B2 | 12/2005 | Kramer |
| 6,982,696 B1 | 1/2006 | Shahoian |
| 6,995,745 B2 | 2/2006 | Boon et al. |
| 7,027,032 B2 | 4/2006 | Rosenberg et al. |
| 7,056,051 B2 | 6/2006 | Fiffie |
| 7,061,467 B2 | 6/2006 | Rosenberg |
| 7,064,655 B2 | 6/2006 | Murray et al. |
| 7,081,888 B2 | 7/2006 | Cok et al. |
| 7,096,852 B2 | 8/2006 | Gregario |
| 7,102,541 B2 | 9/2006 | Rosenberg |
| 7,104,152 B2 | 9/2006 | Levin et al. |
| 7,106,305 B2 | 9/2006 | Rosenberg |
| 7,106,313 B2 | 9/2006 | Schena et al. |
| 7,109,967 B2 | 9/2006 | Hioki et al. |
| 7,112,737 B2 | 9/2006 | Ramstein |
| 7,113,166 B1 | 9/2006 | Rosenberg et al. |
| 7,116,317 B2 | 10/2006 | Gregorio et al. |
| 7,124,425 B1 | 10/2006 | Anderson, Jr. et al. |
| 7,129,854 B2 | 10/2006 | Arneson et al. |
| 7,131,073 B2 | 10/2006 | Rosenberg et al. |
| 7,136,045 B2 | 11/2006 | Rosenberg et al. |
| 7,138,977 B2 | 11/2006 | Kinerk et al. |
| 7,138,985 B2 | 11/2006 | Nakajima |
| 7,143,785 B2 | 12/2006 | Maerkl et al. |
| 7,144,616 B1 | 12/2006 | Unger et al. |
| 7,148,875 B2 | 12/2006 | Rosenberg et al. |
| 7,151,432 B2 | 12/2006 | Tierling |
| 7,151,527 B2 | 12/2006 | Culver |
| 7,151,528 B2 | 12/2006 | Taylor et al. |
| 7,154,470 B2 | 12/2006 | Tierling |
| 7,158,112 B2 | 1/2007 | Rosenberg et al. |
| 7,159,008 B1 | 1/2007 | Wies et al. |
| 7,161,276 B2 | 1/2007 | Face |
| 7,161,580 B2 | 1/2007 | Bailey et al. |
| 7,168,042 B2 | 1/2007 | Braun et al. |
| 7,176,903 B2 | 2/2007 | Katsuki et al. |
| 7,182,691 B1 | 2/2007 | Schena |
| 7,191,191 B2 | 3/2007 | Peurach et al. |
| 7,193,607 B2 | 3/2007 | Moore et al. |
| 7,195,170 B2 | 3/2007 | Matsumoto et al. |
| 7,196,688 B2 | 3/2007 | Schena |
| 7,198,137 B2 | 4/2007 | Olien |
| 7,199,790 B2 | 4/2007 | Rosenberg et al. |
| 7,202,851 B2 | 4/2007 | Cunningham et al. |
| 7,205,981 B2 | 4/2007 | Cunningham |
| 7,208,671 B2 | 4/2007 | Chu |
| 7,209,028 B2 | 4/2007 | Boronkay et al. |
| 7,209,117 B2 | 4/2007 | Rosenberg et al. |
| 7,209,118 B2 | 4/2007 | Shahoian et al. |
| 7,210,160 B2 | 4/2007 | Anderson, Jr. et al. |
| 7,215,326 B2 | 5/2007 | Rosenberg |
| 7,216,671 B2 | 5/2007 | Unger et al. |
| 7,218,310 B2 | 5/2007 | Tierling et al. |
| 7,218,313 B2 | 5/2007 | Marcus et al. |
| 7,233,313 B2 | 6/2007 | Levin et al. |
| 7,233,315 B2 | 6/2007 | Gregorio et al. |
| 7,233,476 B2 | 6/2007 | Goldenberg et al. |
| 7,236,157 B2 | 6/2007 | Schena et al. |
| 7,245,202 B2 | 7/2007 | Levin |
| 7,249,951 B2 | 7/2007 | Bevirt et al. |
| 7,250,128 B2 | 7/2007 | Unger et al. |
| 7,253,803 B2 | 8/2007 | Schena et al. |
| 7,253,807 B2 | 8/2007 | Nakajima |
| 7,265,750 B2 | 9/2007 | Rosenberg |
| 7,280,095 B2 | 10/2007 | Grant |
| 7,283,120 B2 | 10/2007 | Grant |
| 7,283,123 B2 | 10/2007 | Braun et al. |
| 7,289,106 B2 | 10/2007 | Bailey et al. |
| 7,289,111 B2 | 10/2007 | Asbill |
| 7,307,619 B2 | 12/2007 | Cunningham et al. |
| 7,308,831 B2 | 12/2007 | Cunningham et al. |
| 7,319,374 B2 | 1/2008 | Shahoian |
| 7,336,260 B2 | 2/2008 | Martin et al. |
| 7,336,266 B2 | 2/2008 | Hayward et al. |
| 7,339,572 B2 | 3/2008 | Schena |
| 7,339,580 B2 | 3/2008 | Westerman et al. |
| 7,342,573 B2 | 3/2008 | Ryynanen |
| 7,355,595 B2 | 4/2008 | Bathiche et al. |
| 7,369,115 B2 | 5/2008 | Cruz-Hernandez et al. |
| 7,390,157 B2 | 6/2008 | Kramer |
| 7,391,861 B2 | 6/2008 | Levy |

(56) References Cited

U.S. PATENT DOCUMENTS

| | | |
|---|---|---|
| 7,397,466 B2 | 7/2008 | Bourdelais et al. |
| 7,403,191 B2 | 7/2008 | Sinclair |
| 7,432,910 B2 | 10/2008 | Shahoian |
| 7,432,911 B2 | 10/2008 | Skarine |
| 7,433,719 B2 | 10/2008 | Dabov |
| 7,489,309 B2 | 2/2009 | Levin et al. |
| 7,511,702 B2 | 3/2009 | Hotelling |
| 7,522,152 B2 | 4/2009 | Olien et al. |
| 7,545,289 B2 | 6/2009 | Mackey et al. |
| 7,548,232 B2 | 6/2009 | Shahoian et al. |
| 7,551,161 B2 | 6/2009 | Mann |
| 7,561,142 B2 | 7/2009 | Shahoian et al. |
| 7,567,232 B2 | 7/2009 | Rosenberg |
| 7,567,243 B2 | 7/2009 | Hayward |
| 7,592,999 B2 | 9/2009 | Rosenberg et al. |
| 7,605,800 B2 | 10/2009 | Rosenberg |
| 7,609,178 B2 | 10/2009 | Son et al. |
| 7,656,393 B2 | 2/2010 | King et al. |
| 7,671,837 B2 | 3/2010 | Forsblad et al. |
| 7,679,611 B2 | 3/2010 | Schena |
| 7,679,839 B2 | 3/2010 | Polyakov et al. |
| 7,688,310 B2 | 3/2010 | Rosenberg |
| 7,701,438 B2 | 4/2010 | Chang et al. |
| 7,728,820 B2 | 6/2010 | Rosenberg et al. |
| 7,733,575 B2 | 6/2010 | Heim et al. |
| 7,743,348 B2 | 6/2010 | Robbins et al. |
| 7,755,602 B2 | 7/2010 | Tremblay et al. |
| 7,808,488 B2 | 10/2010 | Martin et al. |
| 7,834,853 B2 | 11/2010 | Finney et al. |
| 7,843,424 B2 | 11/2010 | Rosenberg et al. |
| 7,864,164 B2 | 1/2011 | Cunningham et al. |
| 7,869,589 B2 | 1/2011 | Tuovinen |
| 7,890,257 B2 | 2/2011 | Fyke et al. |
| 7,890,863 B2 | 2/2011 | Grant et al. |
| 7,920,131 B2 | 4/2011 | Westerman |
| 7,924,145 B2 | 4/2011 | Yuk et al. |
| 7,944,435 B2 | 5/2011 | Rosenberg et al. |
| 7,956,770 B2 | 6/2011 | Klinghult et al. |
| 7,973,773 B2 | 7/2011 | Pryor |
| 7,978,181 B2 | 7/2011 | Westerman |
| 7,978,183 B2 | 7/2011 | Rosenberg et al. |
| 7,978,186 B2 | 7/2011 | Vassallo et al. |
| 7,979,797 B2 | 7/2011 | Schena |
| 7,982,720 B2 | 7/2011 | Rosenberg et al. |
| 7,986,303 B2 | 7/2011 | Braun et al. |
| 7,986,306 B2 | 7/2011 | Eich et al. |
| 7,989,181 B2 | 8/2011 | Blattner et al. |
| 7,999,660 B2 | 8/2011 | Cybart et al. |
| 8,002,089 B2 | 8/2011 | Jasso et al. |
| 8,004,492 B2 | 8/2011 | Kramer et al. |
| 8,013,843 B2 | 9/2011 | Pryor |
| 8,020,095 B2 | 9/2011 | Braun et al. |
| 8,022,933 B2 | 9/2011 | Hardacker et al. |
| 8,031,181 B2 | 10/2011 | Rosenberg et al. |
| 8,044,826 B2 | 10/2011 | Yoo |
| 8,047,849 B2 | 11/2011 | Ahn et al. |
| 8,049,734 B2 | 11/2011 | Rosenberg et al. |
| 8,059,104 B2 | 11/2011 | Shahoian et al. |
| 8,059,105 B2 | 11/2011 | Rosenberg et al. |
| 8,063,892 B2 | 11/2011 | Shahoian et al. |
| 8,063,893 B2 | 11/2011 | Rosenberg et al. |
| 8,068,605 B2 | 11/2011 | Holmberg |
| 8,077,154 B2 | 12/2011 | Emig et al. |
| 8,077,440 B2 | 12/2011 | Krabbenborg et al. |
| 8,077,941 B2 | 12/2011 | Assmann |
| 8,094,121 B2 | 1/2012 | Obermeyer et al. |
| 8,094,806 B2 | 1/2012 | Levy |
| 8,103,472 B2 | 1/2012 | Braun et al. |
| 8,106,787 B2 | 1/2012 | Nurmi |
| 8,115,745 B2 | 2/2012 | Gray |
| 8,123,660 B2 | 2/2012 | Kruse et al. |
| 8,125,347 B2 | 2/2012 | Fahn |
| 8,125,461 B2 | 2/2012 | Weber et al. |
| 8,130,202 B2 | 3/2012 | Levine et al. |
| 8,144,129 B2 | 3/2012 | Hotelling et al. |
| 8,144,271 B2 | 3/2012 | Han |
| 8,154,512 B2 | 4/2012 | Olien et al. |
| 8,154,527 B2 * | 4/2012 | Ciesla et al. ................. 345/173 |
| 8,159,461 B2 | 4/2012 | Martin et al. |
| 8,162,009 B2 | 4/2012 | Chaffee |
| 8,164,573 B2 | 4/2012 | Dacosta et al. |
| 8,169,306 B2 | 5/2012 | Schmidt et al. |
| 8,169,402 B2 | 5/2012 | Shahoian et al. |
| 8,174,372 B2 | 5/2012 | Da Costa |
| 8,174,495 B2 | 5/2012 | Takashima et al. |
| 8,174,508 B2 | 5/2012 | Sinclair et al. |
| 8,174,511 B2 | 5/2012 | Takenaka et al. |
| 8,178,808 B2 | 5/2012 | Strittmatter |
| 8,179,375 B2 | 5/2012 | Ciesla et al. |
| 8,179,377 B2 | 5/2012 | Ciesla et al. |
| 8,188,989 B2 | 5/2012 | Levin et al. |
| 8,195,243 B2 | 6/2012 | Kim et al. |
| 8,199,107 B2 | 6/2012 | Xu et al. |
| 8,199,124 B2 | 6/2012 | Ciesla et al. |
| 8,203,094 B2 | 6/2012 | Mittleman et al. |
| 8,203,537 B2 | 6/2012 | Tanabe et al. |
| 8,207,950 B2 | 6/2012 | Ciesla et al. |
| 8,212,772 B2 | 7/2012 | Shahoian |
| 8,217,903 B2 | 7/2012 | Ma et al. |
| 8,217,904 B2 | 7/2012 | Kim |
| 8,223,278 B2 | 7/2012 | Kim et al. |
| 8,224,392 B2 | 7/2012 | Kim et al. |
| 8,228,305 B2 | 7/2012 | Pryor |
| 8,232,976 B2 | 7/2012 | Yun et al. |
| 8,243,038 B2 | 8/2012 | Ciesla et al. |
| 8,253,052 B2 | 8/2012 | Chen |
| 8,253,703 B2 | 8/2012 | Eldering |
| 8,279,172 B2 | 10/2012 | Braun et al. |
| 8,279,193 B1 | 10/2012 | Birnbaum et al. |
| 8,310,458 B2 | 11/2012 | Faubert et al. |
| 8,345,013 B2 | 1/2013 | Heubel et al. |
| 8,350,820 B2 | 1/2013 | Deslippe et al. |
| 8,362,882 B2 | 1/2013 | Heubel et al. |
| 8,363,008 B2 | 1/2013 | Ryu et al. |
| 8,367,957 B2 | 2/2013 | Strittmatter |
| 8,368,641 B2 | 2/2013 | Tremblay et al. |
| 8,378,797 B2 | 2/2013 | Pance et al. |
| 8,384,680 B2 | 2/2013 | Paleczny et al. |
| 8,390,594 B2 | 3/2013 | Modarres et al. |
| 8,395,587 B2 | 3/2013 | Cauwels et al. |
| 8,395,591 B2 | 3/2013 | Kruglick |
| 8,400,402 B2 | 3/2013 | Son |
| 8,400,410 B2 | 3/2013 | Taylor et al. |
| 2001/0008396 A1 | 7/2001 | Komata |
| 2002/0104691 A1 | 8/2002 | Kent et al. |
| 2002/0106614 A1 | 8/2002 | Prince et al. |
| 2002/0110237 A1 | 8/2002 | Krishnan |
| 2002/0149570 A1 * | 10/2002 | Knowles et al. ............. 345/173 |
| 2003/0087698 A1 | 5/2003 | Nishiumi et al. |
| 2003/0179190 A1 | 9/2003 | Franzen |
| 2003/0206153 A1 | 11/2003 | Murphy |
| 2004/0001589 A1 | 1/2004 | Mueller et al. |
| 2004/0056876 A1 | 3/2004 | Nakajima |
| 2004/0056877 A1 | 3/2004 | Nakajima |
| 2004/0114324 A1 | 6/2004 | Kusaka et al. |
| 2004/0164968 A1 | 8/2004 | Miyamoto |
| 2004/0178006 A1 | 9/2004 | Cok |
| 2005/0007349 A1 | 1/2005 | Vakil et al. |
| 2005/0231489 A1 | 10/2005 | Ladouceur et al. |
| 2005/0253816 A1 | 11/2005 | Himberg et al. |
| 2006/0087479 A1 | 4/2006 | Sakurai et al. |
| 2006/0098148 A1 | 5/2006 | Kobayashi et al. |
| 2006/0118610 A1 | 6/2006 | Pihlaja et al. |
| 2006/0152474 A1 | 7/2006 | Saito et al. |
| 2006/0154216 A1 | 7/2006 | Hafez et al. |
| 2006/0214923 A1 | 9/2006 | Chiu et al. |
| 2006/0238495 A1 | 10/2006 | Davis |
| 2006/0256075 A1 | 11/2006 | Anastas et al. |
| 2007/0013662 A1 | 1/2007 | Fauth |
| 2007/0036492 A1 | 2/2007 | Lee |
| 2007/0085837 A1 | 4/2007 | Ricks et al. |
| 2007/0108032 A1 | 5/2007 | Matsumoto et al. |
| 2007/0122314 A1 | 5/2007 | Strand et al. |
| 2007/0130212 A1 | 6/2007 | Peurach et al. |

(56) References Cited

U.S. PATENT DOCUMENTS

| | | |
|---|---|---|
| 2007/0165004 A1 | 7/2007 | Seelhammer et al. |
| 2007/0171210 A1 | 7/2007 | Chaudhri et al. |
| 2007/0229233 A1 | 10/2007 | Dort |
| 2007/0236469 A1 | 10/2007 | Woolley et al. |
| 2007/0247429 A1 | 10/2007 | Westerman |
| 2007/0273561 A1 | 11/2007 | Philipp |
| 2007/0296702 A1 | 12/2007 | Strawn et al. |
| 2007/0296709 A1 | 12/2007 | Guanghai |
| 2008/0010593 A1 | 1/2008 | Uusitalo et al. |
| 2008/0024459 A1 | 1/2008 | Poupyrev et al. |
| 2008/0054875 A1 | 3/2008 | Saito |
| 2008/0062151 A1* | 3/2008 | Kent .............................. 345/177 |
| 2008/0136791 A1 | 6/2008 | Nissar |
| 2008/0138774 A1 | 6/2008 | Ahn et al. |
| 2008/0143693 A1 | 6/2008 | Schena |
| 2008/0150911 A1 | 6/2008 | Harrison |
| 2008/0165139 A1 | 7/2008 | Hotelling et al. |
| 2008/0248836 A1 | 10/2008 | Caine |
| 2008/0251368 A1 | 10/2008 | Holmberg et al. |
| 2008/0286447 A1 | 11/2008 | Alden et al. |
| 2008/0303796 A1 | 12/2008 | Fyke |
| 2009/0002328 A1 | 1/2009 | Ullrich et al. |
| 2009/0002337 A1 | 1/2009 | Chang |
| 2009/0009480 A1 | 1/2009 | Heringslack |
| 2009/0015547 A1 | 1/2009 | Franz et al. |
| 2009/0033617 A1 | 2/2009 | Lindberg et al. |
| 2009/0085878 A1 | 4/2009 | Heubel et al. |
| 2009/0106655 A1 | 4/2009 | Grant et al. |
| 2009/0115733 A1 | 5/2009 | Ma et al. |
| 2009/0115734 A1 | 5/2009 | Fredriksson et al. |
| 2009/0128503 A1 | 5/2009 | Grant et al. |
| 2009/0129021 A1 | 5/2009 | Dunn |
| 2009/0135145 A1 | 5/2009 | Chen et al. |
| 2009/0140989 A1 | 6/2009 | Ahlgren |
| 2009/0160813 A1 | 6/2009 | Takashima et al. |
| 2009/0167508 A1 | 7/2009 | Fadell et al. |
| 2009/0167509 A1 | 7/2009 | Fadell et al. |
| 2009/0167567 A1 | 7/2009 | Halperin et al. |
| 2009/0167677 A1 | 7/2009 | Kruse et al. |
| 2009/0167704 A1 | 7/2009 | Terlizzi et al. |
| 2009/0174687 A1* | 7/2009 | Ciesla et al. .................. 345/174 |
| 2009/0181724 A1 | 7/2009 | Pettersson |
| 2009/0182501 A1 | 7/2009 | Fyke et al. |
| 2009/0195512 A1 | 8/2009 | Pettersson |
| 2009/0207148 A1* | 8/2009 | Sugimoto et al. ............. 345/173 |
| 2009/0215500 A1 | 8/2009 | You et al. |
| 2009/0243998 A1 | 10/2009 | Wang |
| 2009/0250267 A1 | 10/2009 | Heubel et al. |
| 2009/0289922 A1 | 11/2009 | Henry |
| 2009/0303022 A1 | 12/2009 | Griffin et al. |
| 2009/0309616 A1 | 12/2009 | Klinghult et al. |
| 2010/0043189 A1 | 2/2010 | Fukano |
| 2010/0073241 A1 | 3/2010 | Ayala Vazquez et al. |
| 2010/0097323 A1 | 4/2010 | Edwards et al. |
| 2010/0109486 A1 | 5/2010 | Polyakov et al. |
| 2010/0121928 A1 | 5/2010 | Leonard |
| 2010/0177050 A1 | 7/2010 | Heubel et al. |
| 2010/0182245 A1 | 7/2010 | Edwards et al. |
| 2010/0232107 A1 | 9/2010 | Dunn |
| 2010/0237043 A1 | 9/2010 | Garlough |
| 2010/0296248 A1 | 11/2010 | Campbell et al. |
| 2010/0298032 A1 | 11/2010 | Lee et al. |
| 2011/0001613 A1 | 1/2011 | Ciesla et al. |
| 2011/0011650 A1 | 1/2011 | Klinghult |
| 2011/0018813 A1 | 1/2011 | Kruglick |
| 2011/0029862 A1 | 2/2011 | Scott et al. |
| 2011/0043457 A1 | 2/2011 | Oliver et al. |
| 2011/0074691 A1 | 3/2011 | Causey et al. |
| 2011/0148807 A1 | 6/2011 | Fryer |
| 2011/0157056 A1 | 6/2011 | Karpfinger |
| 2011/0175844 A1* | 7/2011 | Berggren ...................... 345/174 |
| 2011/0241442 A1 | 10/2011 | Mittleman et al. |
| 2011/0254709 A1 | 10/2011 | Ciesla et al. |
| 2012/0032886 A1 | 2/2012 | Ciesla et al. |
| 2012/0038583 A1 | 2/2012 | Westhues et al. |
| 2012/0043191 A1 | 2/2012 | Kessler et al. |
| 2012/0056846 A1 | 3/2012 | Zaliva |
| 2012/0062483 A1 | 3/2012 | Ciesla et al. |
| 2012/0098789 A1 | 4/2012 | Ciesla et al. |
| 2012/0105333 A1 | 5/2012 | Maschmeyer et al. |
| 2012/0200528 A1 | 8/2012 | Ciesla et al. |
| 2012/0200529 A1 | 8/2012 | Ciesla et al. |
| 2012/0206364 A1 | 8/2012 | Ciesla et al. |
| 2012/0218213 A1 | 8/2012 | Ciesla et al. |
| 2012/0218214 A1 | 8/2012 | Ciesla et al. |
| 2012/0223914 A1 | 9/2012 | Ciesla et al. |
| 2012/0235935 A1 | 9/2012 | Ciesla et al. |
| 2012/0242607 A1 | 9/2012 | Ciesla et al. |
| 2012/0306787 A1 | 12/2012 | Ciesla et al. |
| 2013/0019207 A1 | 1/2013 | Rothkopf et al. |

FOREIGN PATENT DOCUMENTS

| | | |
|---|---|---|
| JP | 2006268068 A | 10/2006 |
| JP | 2006285785 A | 10/2006 |
| JP | 2009064357 A | 3/2009 |
| KR | 100677624 B | 1/2007 |
| WO | 2004028955 A | 4/2004 |
| WO | 2008037275 A1 | 4/2008 |
| WO | 2009002605 A | 12/2008 |
| WO | 2009044027 A2 | 4/2009 |
| WO | 2009088985 A | 7/2009 |
| WO | 2010077382 A | 7/2010 |
| WO | 2010078596 A | 7/2010 |
| WO | 2010078597 A | 7/2010 |
| WO | 2011003113 A | 1/2011 |
| WO | 2011087816 A | 7/2011 |
| WO | 2011087817 A | 7/2011 |
| WO | 2011112984 A | 9/2011 |
| WO | 2011133604 A | 10/2011 |
| WO | 2011133605 A | 10/2011 |

OTHER PUBLICATIONS http://sharp-world.com/corporate/news/070831.html, Sharp Press Release, Aug. 31, 2007, 3 pages "Sharp Develops and Will Mass Produce New System LCD with Embedded Optical Sensors to Provide Input Capabilities Including Touch Screen and Scanner Functions".

Preumont, A. Vibration Control of Active Structures: An Introduction, Jul. 2011.

* cited by examiner

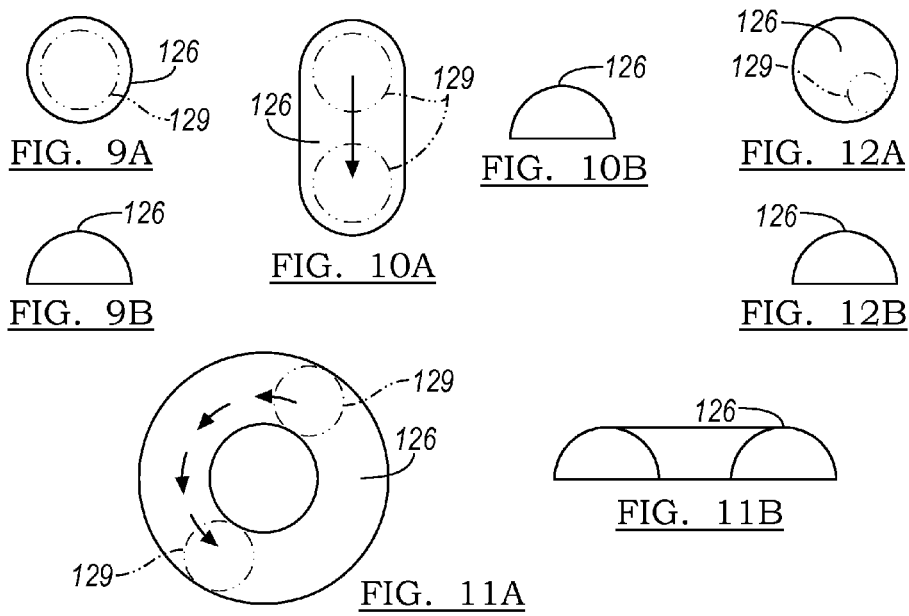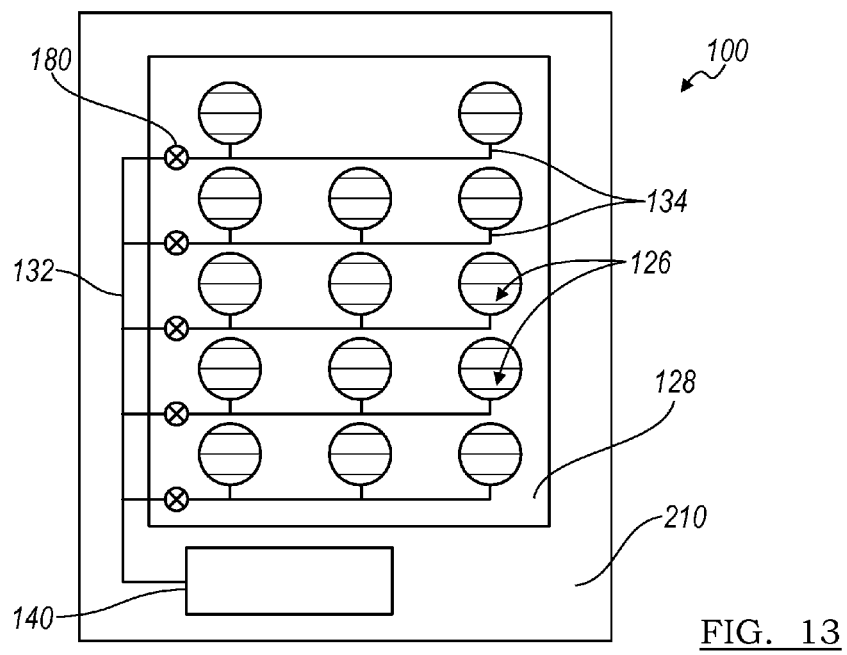

USER INTERFACE SYSTEM AND METHOD

CROSS-REFERENCE TO RELATED APPLICATIONS

This application claims the benefit of U.S. Provisional Application No. 61/405,149, filed 20 Oct. 2010, which is incorporated in its entirety by this reference.

This application is related to U.S. application Ser. No. 11/969,848 filed on 4 Jan. 2008 and entitled "System and Method for Raised Touch Screens", U.S. application Ser. No. 12/319,334 filed on 5 Jan. 2009 and entitled "User Interface System", U.S. application Ser. No. 12/497,622 filed on 3 Jul. 2009 and entitled "User Interface System", and U.S. application Ser. No. 13/278,125 filed on 20 Oct. 2011 and entitled "User Interface System", which are all incorporated in their entirety by this reference.

TECHNICAL FIELD

This invention relates generally to touch sensitive user interfaces, and more specifically to a new and useful system and method for selectively raising portions of a touch sensitive display.

BACKGROUND

Touch-sensitive displays (e.g., touch screens) allow users to input commands and data directly into a display, which is particularly useful in various applications. Such touch screen applications include various consumer products, including cellular telephones and user interfaces for industrial process control. Depending on the specific application, these touch-sensitive displays are commonly used in devices ranging from small handheld PDAs, to medium sized tablet computers, to large industrial implements.

It is often convenient for a user to input and read data on the same display. Unlike a dedicated input device, such as a keypad with discrete and tactilely distinguishable keys, most touch-sensitive displays generally define a flat and continuous input surface providing no significant tactile guidance to the user. Instead, touch-sensitive displays rely on visual cues (e.g., displayed images) to guide user inputs.

A serious drawback of touch-sensitive displays is thus the inherent difficulty a user faces when attempting to input data accurately because adjacent buttons are not distinguishable by feel. Improper keystrokes are common, which forces the user to focus both on the keypad (to properly input the next keystroke) and on the text input line (to check for errors); generally, the user is forced to keep his or her eyes on the display in order to minimize input errors. The importance of tactile guidance is readily apparent in the competition between the Apple's iPhone and RIM's BlackBerry 8800. Touch-sensitive displays and physical hard buttons each have benefits and drawbacks, and digital devices generally incorporate one such component or the other, although some devices do include both disparate components, which often makes for either bulkier devices or devices with less operating power due to size constraints.

As with many touch sensitive displays, nearly any touch on the display surface is registered as an input; this substantially prevents the user from resting a finger or palm on the touch surface while generating proper inputs (such as typing). Furthermore, some touch sensitive displays rely on capacitance changes due to the presence of a finger at a location on the touch surface to indicate a user input, and these devices do not sense user inputs when a barrier exists between a finger of the user and the touch surface, such as when the user is wearing a glove.

Thus, there is a need in the touch-based interface field to create a new and useful interface that incorporates tactile guidance for one or more control buttons and/or incorporates alternatives to sensing a user input. This invention provides such an interface and associated method.

BRIEF DESCRIPTION OF THE FIGURES

FIGS. 9, 10, 11, and 12 are plan and elevation views of, respectively, a button deformation, a slider deformation, a slider ring deformation, a guide deformation, and a pointing stick deformation of a deformable region of the preferred embodiment;

FIG. 13 is a plan view of a variation of the user interface system of the preferred embodiment of the invention.

DESCRIPTION OF THE PREFERRED EMBODIMENTS

The following description of the preferred embodiments of the invention is not intended to limit the invention to these preferred embodiments, but rather to enable any person skilled in the art to make and use this invention.

1. The User Interface System

Figure 1A:
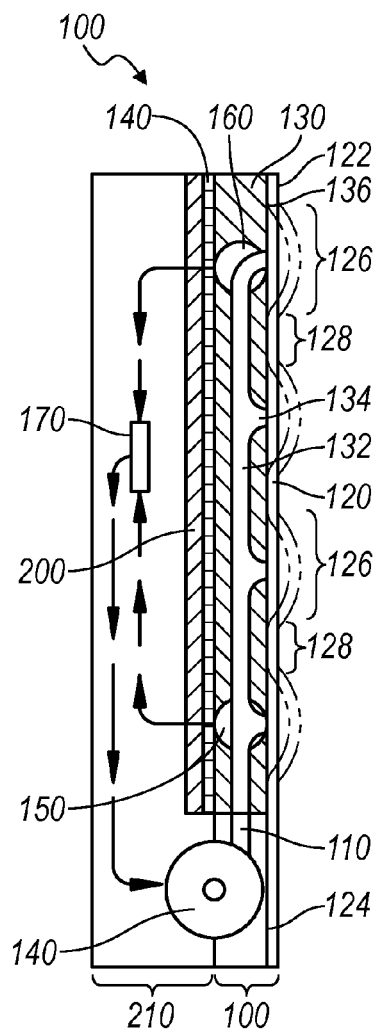
FIG. 1 includes an cross-sectional elevation and plan view of the user interface system of a preferred embodiment of the invention.
Figure 1B:
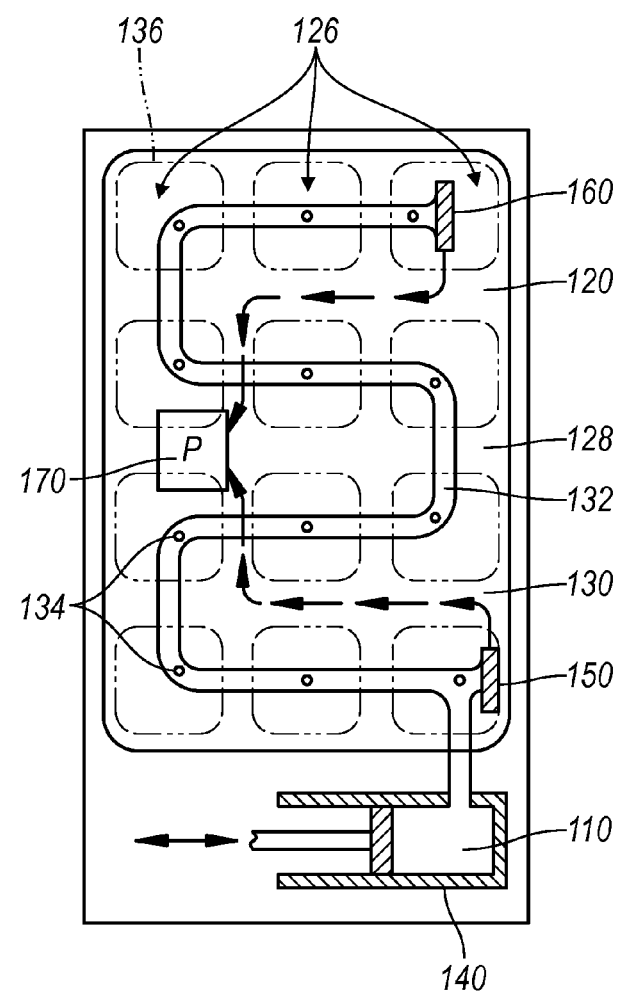
Figure 5:
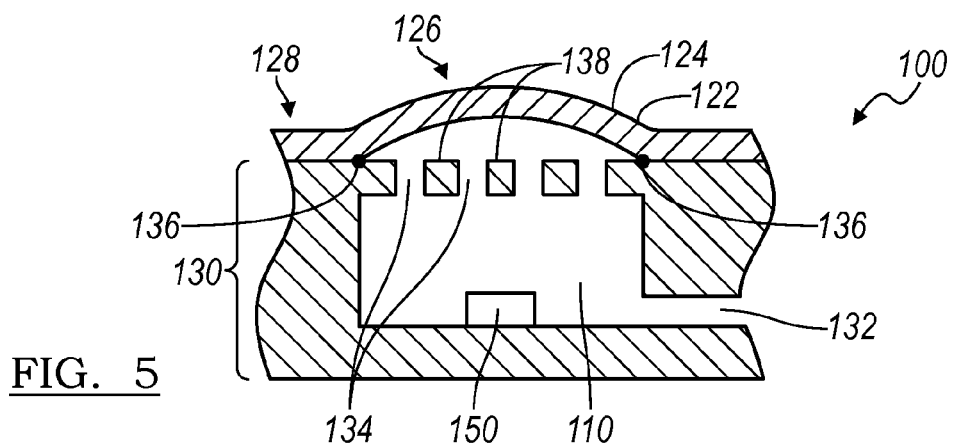
FIG. 5 is a cross-sectional elevation view of the deformable region, of the preferred embodiment, in the expanded state.
Figure 6:
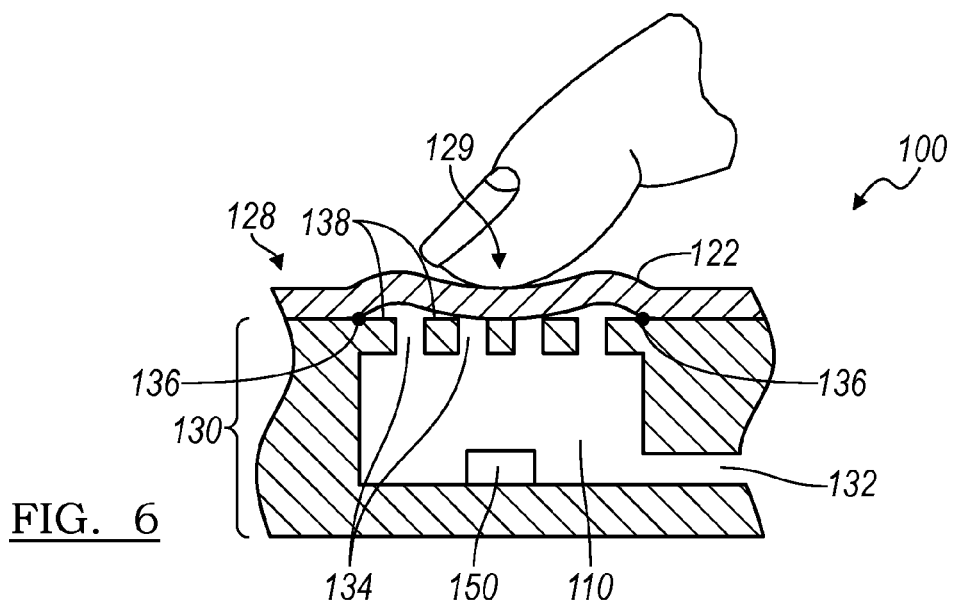
FIG. 6 is a cross-sectional elevation view of the deformable region, of the preferred embodiment, in the user input state.

As shown in FIG. 1, the user interface system 100 of the preferred embodiment includes: a volume of fluid 110; a tactile layer 120; a substrate 130; a displacement device 140; a first pressure sensor 150; a second pressure sensor 160; and a processor 170. The tactile layer 120 defines an outer tactile surface 122 touchable by a user and a back surface 124 opposite the tactile surface 122; the tactile layer 120 includes an undeformable region 128 and a plurality of deformable regions 126, wherein the deformable regions 126 are operable between: a retracted state (shown in FIG. 4), wherein the deformable regions 126 are substantially flush with the undeformable region 128; and an expanded state (shown in FIG. 5), wherein the deformable regions 126 are substantially proud of the undeformable region 128. The substrate 130 is joined to the back surface 124 of the undeformable region 128 and defines at least one fluid port 134 per deformable region 126, and a fluid channel 132, wherein the fluid ports 134 communicate the fluid 110 between the fluid channel 132 and the back surfaces 124 of the deformable regions 126. The displacement device 140 displaces a portion of the fluid 110 through the fluid channel 132 and the fluid ports 134 to transition the deformable regions 126 from the retracted state to the expanded state. The first and second pressure sensors 150, 160 detect changes in fluid pressure within a portion of the fluid 110 due to an input force applied to the tactile surface 122 at a particular deformable region 126 (such as in a user input state shown in FIG. 6). The processor 170 determines the particular deformable region 126 to be an input location based upon a comparison of the changes in fluid pressure detected by the first and second pressure sensors 150, 160. The processor 170 may further characterize input forces received at the tactile surface 122 as various input types based upon fluid pressure change rates, fluid pressure magnitude, or time-dependent changes in the fluid pressure. The substrate 130 may further define a support surface 138 that provides a hard stop for the deformable regions 126 of the tactile layer 120 such that a user may not inwardly deform a deformable region 126 past a certain depth, such as flush with the undeformable region 128, as shown in FIG. 6. Furthermore, an attachment point 136 may join the tactile layer 120 to the substrate 130 and define a border between a deformable region 126 and an undeformable region 128.

The user interface system 100 may further include one or more of the following: a valve 180; a touch sensor 190; and a display 200. The valve 180 may isolate fluid within a single fluid port and deformable region pair, within a plurality of fluid ports and deformable region pairs, or within a portion of the fluid channel 132. The valve 180 preferably retains a portion of the fluid no at the back surface 124 of at least one deformable region 126 to maintain the deformable region 126 in either the expanded state or retracted state. The touch sensor 190 preferably detects a user touch 129 on the tactile surface 122, such as at the undeformable region 128. The display 200 preferably outputs an image that is transmitted, through the substrate 130 and the tactile layer 120, to a user.

The user interface system 100 functions to provide tactile guidance to a user by expanding and retracting the deformable regions 126 to form distinguishable input regions on the tactile surface 122 of the tactile layer 120, as described in U.S. patent application Ser. No. 12/497,622 titled "User Interface system," which is incorporated in its entirety by reference. The processor 170 and the first and second pressure sensors 150, 160 cooperate to determine the location of an input force 129 applied to the tactile surface 122. Specifically, the pressure sensors and processor 170 cooperate to select, from the plurality of deformable regions 126, the particular deformable region 126 to which the input force 129 was applied. The user interface system 100 is preferably incorporated into an electronic device 210 that includes a digital display, such as the display of an automotive console, a desktop computer, a laptop computer, a tablet computer, a television, a radio, a desk phone, a mobile phone, a PDA, a personal navigation device, a personal media player, a camera, a gaming console or controller, a remote control, or a watch. Such electronic devices often incorporate touch sensors and/or touch displays incorporating capacitive, optical, or resistive touch-sensing technology, or possibly other touch-sensing methods. However, drawbacks may exist in relying on such technology to detect user inputs on deformable tactile surfaces of such electronic devices. Therefore, detecting user inputs at the deformable regions 126 by sensing pressure changes within the fluid 110 used to deform the deformable regions 126 may be more reliable and/or effective than current touch sensor technology. By coupling each fluid port 134 and associated deformable region 126 to a central fluid channel 132, the number of pressure sensors necessary to isolate the input force location may be substantially reduced. In an example of the user interface device arranged on a display 200 of an electronic device 210, wherein a keypad including twenty-six letters is rendered on the display 200, the tactile layer 120 includes an array of twenty-six deformable regions 126, each a separate input region aligned with an image of different letter; the deformable regions 126 are coupled to the single fluid channel 132 via fluid ports 134, and the displacement device 140 expands all of the deformable regions 126 simultaneously such that the user may tactilely distinguish between any two input regions (deformable regions 126). Rather than implement twenty-six individual pressure sensors (i.e. one sensor per input region), substantially fewer (e.g., two) pressure sensors detect fluid pressure changes within the fluid channel 132 and the processor 170 interprets the signals from the pressure sensors to isolate (i.e. determine) a particular deformable region 126 to which the input force 129 is applied by a user. The tactile layer 120 and substrate 130 are preferably substantially transparent such that images on the display 200 may be viewed by the user. However, the user interface system 100 may be incorporated into any device in any way to reduce the number of sensors and/or sensor complexity required to capture a user input on a deformable tactile surface 122.

2. The Volume of Fluid

The volume of fluid 110 of the preferred embodiment functions as the medium by which pressure is conveyed to the deformable regions 126 to expand or retract the deformable regions 126 and by which forces applied to the tactile surface 122 are conveyed to the pressure sensors 150, 160. The fluid no is preferably a substantially incompressible fluid, but may alternatively be a compressible fluid or any other suitable fluid sustaining a pressure change during operation of the user interface system 100. The fluid 110 is preferably a liquid (such as water, glycerin, or ethylene glycol), but may alternatively be a gas (such as air, nitrogen, or argon) or any other substance (such as a gel or aerogel) that expands the deformable region 126 and deforms the tactile surface 122. The fluid 110 preferably substantially fills the fluid ports 134 and the fluid channel 132 and is substantially isolated from other fluids that may be external to the user interface system 100 (or the electronic device 210 to which the user interface system 100 is attached), which may reduce the likelihood of air other potential contaminants entering and/or creating bubbles within the fluid 110 that may disrupt the transmission of an image through the user interface system 100. However, any other suitable type of the fluid 110 may be used.

The volume of fluid is preferably substantially transparent such that an image generated by the display 200 may be transmitted through the fluid 110. The volume of fluid 110 also preferably has an index of refracted substantially similar to the index of refraction of the substrate 130 such that light (e.g., an image) passing through a fluid channel 132 (and/or fluid port 134) filled with the fluid 110 is not optically distorted by the fluid-fluid channel junction. However, the volume of fluid 110 may have any other property.

3. The Tactile Layer and the Deformable Regions

Figure 8:
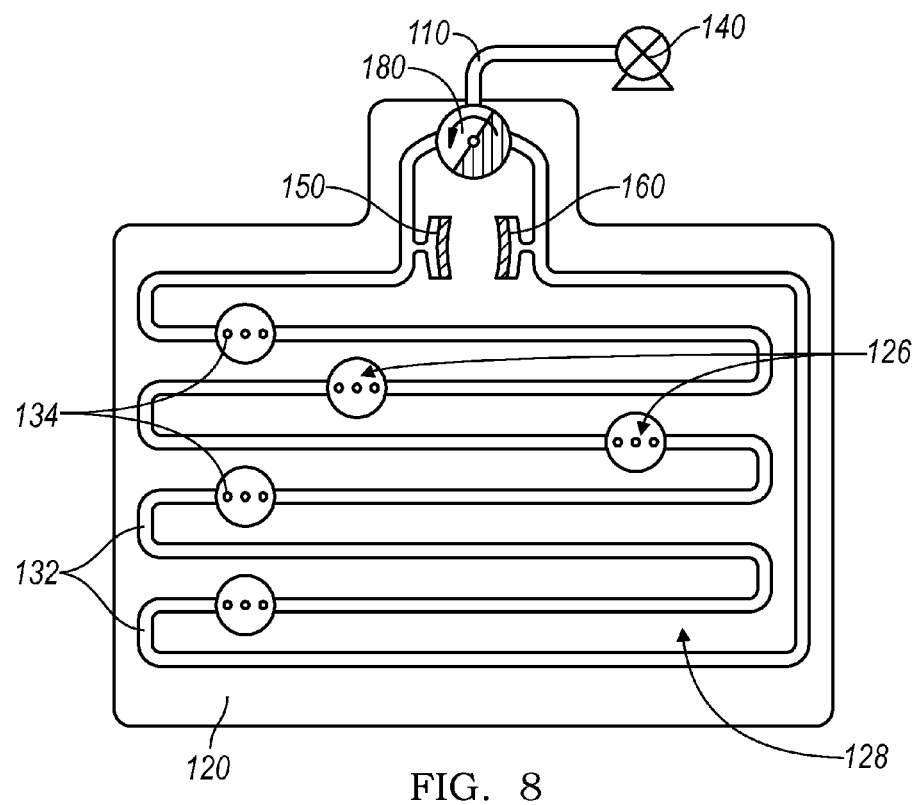
FIG. 8 is a plan view of a variation of the fluid channel, the valve, and the first and second pressure sensors of the preferred embodiment.

The tactile layer 120 of the preferred embodiment functions to define deformable regions 126 that serve as input regions providing tactile guidance and receive input forces indicating a user input. The tactile layer 120 preferably defines the tactile surface 122 that is continuous such that, when swiping a finger across the tactile surface 122, the user does not detect interruptions or seams within the tactile layer 120. Specifically, the undeformable region 128 and a deformable region 126 preferably comprise a single continuous sheet 220 of material without tactilely distinguishable features between regions. Alternatively, the tactile surface 122 may include features distinguishing one region from another, such as by differing textures, hardness, dimples, or other tactilely distinguishable features. The tactile surface 122 is also preferably planar; the tactile surface 122 may be naturally planar in form or arranged on a surface of the substrate 130 that is substantially planar. The tactile layer deforms upon displacement of a portion of the fluid 110 through the fluid channel 132 and the fluid ports 134 to the back surface 124 of the tactile region at the deformable regions 126; the tactile layer 120 also preferably "relaxes" or "un-deforms" back to a normal planar form upon retraction of the portion of the fluid 110, whether actively by reversing flow direction of the displacement device 140 (as shown in FIG. 8) or passively by allowing the elasticity of the tactile surface 122 to force fluid back through the fluid ports 134. In one variation, the tactile layer 120 contains a deformable region 126 that is elastic and an undeformable region 128 that is relatively less elastic. In another variation, the tactile layer 120 is generally of uniform elasticity throughout at least one cross-section. In yet another variation, the tactile layer 120 includes or consists of a smart material, such as Nickel Titanium ("Nitinol"), that has a selective and/or variable elasticity. The tactile layer 120 may be of a uniform thickness or varying thickness; for example, the tactile layer 120 may be thinner at the deformable regions than at the undeformable region such that the deformable regions are more flexible than the undeformable region.

The tactile layer 120 is preferably optically transparent, but may alternatively be translucent or opaque. Furthermore, the tactile layer 120 preferably has one or more of the following properties: high light transmission, low haze, wide viewing angle, minimal internal back reflectance, scratch resistance, chemical resistance, stain resistance, smoothness (e.g., low coefficient of friction), minimal out-gassing, chemical inertness in the presence of the fluid 110, and/or relatively low rate of degradation when exposed to ultraviolet light. The tactile layer 120 preferably comprises a suitable elastic material, including polymers and silicon-based elastomers such as poly-dimethylsiloxane (PDMS) or RTV Silicon (e.g., RTV Silicon 615). In the variation above in which the tactile layer 120 includes distinct elastic and relatively inelastic portions, the inelastic portion is preferably comprised of a polymer or glass, such as: elastomers; silicon-based organic polymers such as poly-dimethylsiloxane (PDMS); thermoset plastics such as polymethyl methacrylate (PMMA); photocurable solvent-resistant elastomers such as perfluropolyethers; polyethylene terephthalate (PET); or any other suitable material. The tactile layer 120 may, however, comprise any other suitable material.

Each deformable region 126, of the plurality of deformable regions of the tactile layer 120, is operable between at least two states, including: a retracted state, wherein the deformable regions 126 are substantially flush with the undeformable region 128; and an expanded state, wherein the deformable regions 126 are substantially proud of the undeformable region 128. However, a deformable region 126 may be operable in any other state, such as a recessed state, wherein the deformable region 126 is recessed substantially below the undeformable region 128. A deformable region 126 in the expanded state may act as: (1) a button that, when pressed by the user, implies a single input location (shown in FIG. 9); (2) a slider that, when pressed, implies an input locations at multiple inputs along the deformable region 126 (shown in FIG. 10); and/or (3) a pointing stick that implies a directional input (shown in FIG. 11). The deformation of the deformable region 126 may, however, provide any other suitable input type wherein user contact at the deformable region 126 affects fluid pressure in a portion of the fluid in a way detectable by at least one of the pressure sensors.

A deformable region 126 that is a button preferably has a dome-like shape, as shown in FIG. 9, but may alternatively have a cylindrical-like shape (with a flat top surface), a pyramid-like shape, a cube-like shape (with a flat top), or any other suitable button shape. The pressure sensors 150, 160 preferably recognize a user touch 129 applied to the button as a user input.

A deformable region 126 that is a slider preferably has a ridge like shape, as shown in FIG. 10, but may alternatively have a ring like shape, as shown in FIG. 11; however, a plus-like shape or any other suitable slider shape is also possible. The pressure sensors 150, 160 preferably recognize user touches 129 at different locations along the slider and distinguish these user touches as different user inputs, such as a first input type for a swipe along the slider in a first direction and a second input type for a swipe in the opposite direction. In one variation, the slider is of a ring-like shape and acts like a "click wheel" similar is form and function to the second-generation Apple iPod, as shown in FIG. 11.

A deformable region 126 that is a pointing stick, like the button, preferably has a dome-like shape, as shown in FIG. 12, but may alternatively have a cylindrical-like shape (with a flat top surface), a pyramid-like shape, a cube-like shape (with a flat top), or any other suitable button shape. The pressure sensors 150, 160 preferably recognize user touches 129 in different directions and/or at different locations along the pointing stick and distinguish these user touches as different user inputs. Preferably, depression of the expanded deformable region 126 that is a pointing stick implies a user input type related to the location of the depression relative to the geometry of the pointing stick. For example, in the variation in which the deformable region 126 is a pointing stick with a dome-like shape, a depression of the deformable region 126 in the upper right quadrant is interpreted differently than a depression thereof in the lower right quadrant. Additionally, the user may depress the deformable region 126 that is a pointing stick in a sweeping motion, for example, a "sweep" from the upper right quadrant to the lower right quadrant of the deformable region 126. This may be interpreted as a dynamic input, such as those recognized on the "click wheel" of a second generation Apple iPod. In another example, the inputs on a deformable region 126 that is a pointing stick may perform in a manner similar to the pointing stick trademarked by IBM as the TRACKPOINT and by Synaptics as the TOUCHSTYK (which are both informally known as the "nipple").

4. The Substrate

The substrate 130 of the preferred embodiment functions to support the tactile layer 120 such that fluid 110 communicated through the fluid channel 132 and the fluid ports 134 outwardly deforms the deformable regions 126. The back surface 124 of the tactile layer 120 is preferably attached to the substrate 130 via an attachment point 136 (shown in FIGS. 1 and 5) that at least partially defines the size and/or shape of the undeformable region 128; the attachment point 136 functions to define a border between a deformable region 126 and the undeformable region 128 of the tactile layer 120. The attachment point 136 may be a series of continuous points that define an edge or boundary, but may alternatively be a series of non-continuous points; the system may also comprise a series of attachment points. The attachment point 136 may be formed via an adhesive, chemical bonding, welding, diffusion bonding, or any other suitable attachment material and/or method. The method and/or material used to form the attachment point 136 preferably yields similar optical properties as the tactile layer 120 and/or the substrate 130, but may alternatively yield any other optical property. Other undeformable regions of the tactile layer 120 may or may not be adhered to the substrate 130 using similar or identical materials and/or methods. However, any other suitable arrangement, material, and/or manufacturing method may be used to join the substrate 130 to the tactile layer 120. The substrate and tactile layer assembly may therefore comprise a sheet 220 containing at least the passive elements necessary to provide tactile guidance on a surface, such as on a display of an electronic device 210.

Figure 4:
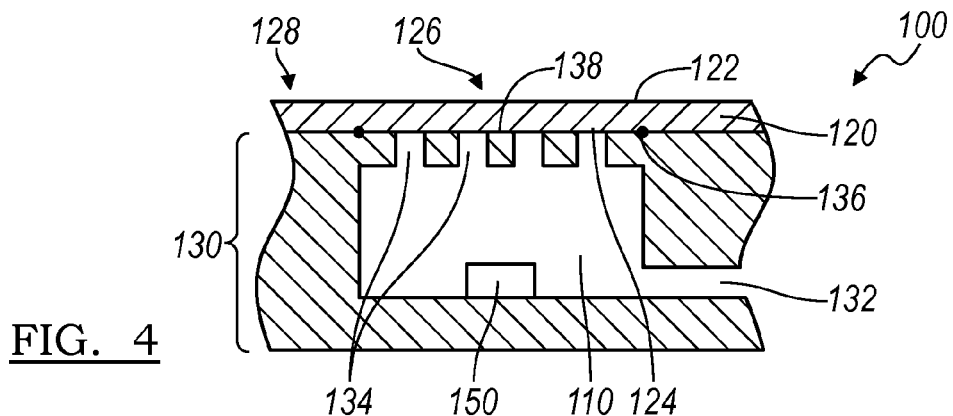
FIG. 4 is a cross-sectional elevation view of the deformable region, of the preferred embodiment, in the retracted state.

The substrate 130 preferably comprises a substantially rigid material such that a force applied on the tactile surface 122 and transmitted through the substrate 130 does not substantially deform any of the fluid ports 134 or the fluid channel 132. By substantially maintaining the cross-section of the fluid channel 132 and/or fluid ports 134, the fluid is still preferably communicated throughout the fluid channel 132, fluid ports 134, back surfaces 124 of the deformable regions 126, and the pressure sensors 150, 160 such that the pressure sensors and processor 170 may reliably generate and interpret fluid pressure signals to determine the location of a user input on the tactile surface 122. The substrate 130 also preferably defines a substantially rigid support surface 138 adjacent to a deformable region 126. The support surface 138 of the substrate 130 preferably resists deformation of the deformable region 126 inward past flush with the undeformable region 128, as shown in FIG. 6. This provides support for the tactile layer 120 to substantially prevent the tactile layer 120 from deforming into a fluid port 134 when the force is applied over a deformable region 126. The support surface 138 also preferably provides a hard stop upon which the deformable region 126 rests in the retracted state, as shown in FIG. 4, such as following active withdrawal of a portion of the fluid from the fluid channel 132 to retract the deformable region 126. The substrate 130 is preferably uniform in thickness, though only the side of the substrate 130 adjacent to the tactile layer 120 may be planar. The support surface 138 is also preferably planar, but the support surface 138 may also define a concave geometry into which the deformable layer deforms in a third, recessed state. However, the substrate 130 may be of any other geometry that retains the undeformable region 128 and permits the deformable regions 126 to expand to the expanded state and retract to the retracted state.

The substrate 130 also functions to define the fluid channel 132 and fluid ports 134. In a first variation, the substrate 130 comprises a first sub-layer joined to a second sub-layer, wherein the first sub-layer includes an elongated pocket and the second sub-layer includes a plurality of through-bores. In this variation, the fluid channel 132 is defined by the elongated pocket of the first sub-layer and a surface of the second sub-layer adjacent to first sub-layer; the through-bores of the second sub-layer define the fluid ports 134, and the fluid ports 134 are preferably aligned with the fluid channel 132 such that the fluid is communicable between the fluid ports 134 and the fluid channel 132. In this first variation, the pocket is preferably machined into the second sub-layer, such as by laser ablation, bulk micromachining, or conventional machining (e.g., with a keyseat cutter or endmill), but may also be etched, formed, molded or otherwise created in the first sub-layer. The fluid channel 132 is preferably large enough in cross-section to communicate the fluid to the fluid ports 134 at a suitable flow rate given a pressure increase generated by the displacement device 140; however, the fluid channel 132 is preferably substantially small enough in cross-section such that the fluid channel 132 is substantially difficult for the user to detect visually; however, the fluid no may have an index of refraction matched substantially to that of the substrate 130 such that the fluid channel 132 is substantially difficult for the user to see despite the size of the fluid channel 132. The through-bores are preferably machined into the second sub-layer, such as by laser ablation, bulk micromachining, or conventional drilling, but may also be formed, etched, molded, or otherwise created in the second sub-layer. The bores (fluid ports 134) are preferably substantially small in cross-section such that the user does not detect the fluid ports 134 through the tactile layer 120, either visually when looking through the tactile layer 120 or tactilely when sweeping a finger across the tactile surface 122. For example, the fluid ports 134 may be circular in cross-section and less that 500 um in diameter, though the fluid ports 134 are preferably less than 100 um in diameter. In a second variation, the substrate 130 comprises a first sub-layer joined to a second sub-layer, wherein the first sub-layer defines a recess with border substantially encompassing the perimeter of the deformable regions 126 and the second sub-layer is substantially similar to the second sub-layer described in the first variation. In this second variation, the first and second sub-layers join to enclose the recess and form a substantially long and wide cavity within the substrate 130, wherein the cavity communicates a portion of the fluid to the fluid ports 134. In the first and second variations above, or in any other variation, the first and second sub-layer may be joined by any acceptable means, such as by the materials and/or methods described above to join the tactile layer 120 to the substrate 130. In a third variation, the fluid ports 134 are a property of the material; for example, the substrate 130 may comprise a porous material that includes a series of interconnected cavities that allow the fluid no to flow through the substrate 130 to the back surfaces 124 of the deformable regions 126. However, the substrate 130 may comprise any other material or any number of sub-layers containing any number of features formed by any process, and the sub-layers may be joined (if applicable) in any other way. Furthermore, the substrate 130 may define any number of fluid ports 134, of any shape or size, per deformable region 126.

In the variation of the substrate 130 that defines a substantially planar surface adjacent to the back surface 124 of the tactile layer 120, the fluid channel 132 preferably communicates a portion of the fluid no in a direction substantially parallel to the plane of the substrate 130. The fluid channel 132 is preferably elongated and preferably passes through a substantial portion of the substrate 130. Furthermore, the fluid ports 134 preferably communicate the fluid 110 in a direction substantially normal to the planar surface of the substrate 130. However, the fluid 110 may pass through the fluid ports 134 and fluid channel 132 in any other direction, such as in a variation of the user interface system 100 comprising a series of stacked fluid channels and a network of fluid ports.

The substrate 130 preferably has optical properties substantially similar to the optical properties of the tactile layer 120, such as optical transparency, low internal reflectance, and low haze characteristics. The substrate 130 also preferably has chemical properties similar to those of the tactile layer 120, such as minimal outgassing and chemical inertness in the presence of the fluid 110.

Figure 7:
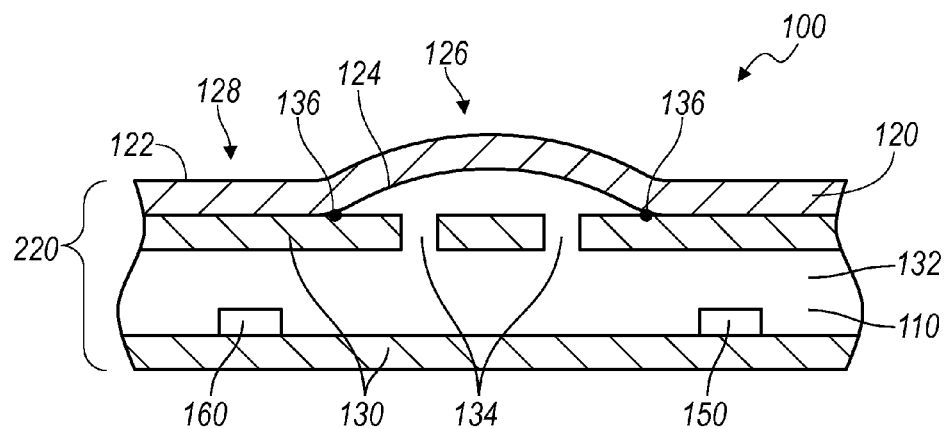
FIG. 7 is an elevation view of a variation of the fluid channel, of the preferred embodiment, with a deformable region in the expanded state.

As shown in FIG. 1, the fluid channel 132 couples the displacement device 140 to the back surfaces 124 of the deformable regions 126. The fluid channel 132 allows the fluid 110 to enter the fluid ports 134 to expand the deformable regions 126. Fluid may also be displaced away from the deformable regions 126 through the fluid channel 132 to retract the deformable regions 126. As shown in FIGS. 3, and 13, in a first variation, a deformable region 126 is arranged beside the fluid channel 132. In a second variation, as shown in FIG. 7, a deformable region 126 is arranged on top of the fluid channel 132; in this second variation, the fluid channel 132 may be of a cross-sectional area substantially similar to that of the fluid port 134, but may alternatively be larger (shown in FIG. 7), smaller (shown in FIG. 2), or of any other suitable size. The second variation of the arrangement of the fluid channel 132 may decrease complexity in the implementation of multiple deformable regions 126. For example, in the first variation, the fluid channel 132 may require extended fluid ports 134 that couple the deformable regions 126 to the fluid channel 132, as shown in FIG. 13; but, in the second variation, the fluid ports 134 may be short and immediately adjacent to the fluid channel 132, as shown in FIGS. 1, 7, and 8. However, the fluid channel 132 may be of a single main channel of any suitable form, such as a zig-zag (FIG. 8), a serpentine (FIG. 1), a loop, a straight channel, a set of parallel channels, and set of parallel and perpendicular intersecting channels, a set of stacked and non-intersecting channels of any form.

The fluid channel 132 preferably includes a first end and a second end. In a first variation, the first end is a fluid inlet and a fluid outlet. In this first variation, the second end is preferably closed, or "blind", such that fluid may neither enter nor exit the fluid channel 132 at the second end, as shown in FIG. 1. In a second variation, the first end functions as a fluid inlet and the second end functions as a fluid outlet, as shown in FIG. 8. In this variation: the fluid channel 132 may define a fluid loop within the user interface system 100; and/or the first and second ends may function as a fluid inlet and a fluid outlet interchangeably. However, any other suitable arrangement of the fluid channel 132 may be used.

5. The Displacement Device

The displacement device 140 of the preferred embodiment functions to displace a portion of the fluid 110 within the fluid channel 132 and fluid ports 134 to expand the deformable regions 126 from the retracted state to the expanded state. The displacement device 140 is preferably a mechanical pump (such as micro pump #MDP2205 from ThinXXS Microtechnology AG of Zweibrucken, Germany or micro pump #mp5 from Bartels Mikrotechnik GmbH of Dortmund, Germany). However, the displacement device 140 may alternatively be a plunger-type device, as shown in FIG. 1, a heating element that expands a portion of the fluid no by heating the fluid, or a series of electrodes that displace a portion of the fluid through the fluid ports 134 via electroosmotic flow. However, the displacement device 140 may alternatively influence the volume of the fluid no in any other suitable manner, for example, as described in U.S. patent application Ser. No. 12/497,622 titled "User Interface System" or in U.S. patent application Ser. No. 13/278,125 titled "User Interface System", which are both hereby incorporated in their entirety by this reference. The displacement device 140 is preferably coupled to the first end of the fluid channel 132, as shown in FIG. 1, but may be coupled to any other section of the fluid channel 132. When implemented in a mobile device, such as a cell phone or tablet computer, the displacement device 140 preferably increases the volume of the fluid no between the substrate 130 and the back surface 124 of the tactile layer 120 at each deformable region 126 by 0.003 ml to 0.1 ml; this volume is preferably suitable to expand a circular deformable region 126, with a diameter between 2 mm and 10 mm, to an extent tacitly distinguishable by the user. When implemented in this or any other application, however, the volume of the fluid displaced may be of any other suitable amount.

6. The First and Second Pressure Sensors

The first and second pressure sensors 150, 160 of the preferred embodiment function to detect a change in fluid pressure within a portion of the fluid no, wherein the pressure change is due to an input force 129 applied to and inwardly deforming a particular deformable region 126. A change in fluid pressure within a portion of the fluid no is preferably communicated to the pressure sensors 150, 160 via a longitudinal pressure wave (e.g., a P-wave) through a portion of the fluid channel 132, a portion of a fluid port 134, or any other fluid conduit within the user interface system 100; however, the pressure change may be communicated via a transverse wave or combination of longitudinal and transverse waves. Pressure wave reflections within the fluid channel 132, fluid ports 134, or any other fluid conduit in the user interface system 100 are also preferably captured by the pressure sensors 150, 160 such that the origin of the pressure wave (e.g., the input force) can be traced via analysis of the pressure wave data by the processor 170.

The first and second pressure sensors 150, 160 are preferably coupled to the fluid channel 132, wherein the first pressure sensor 150 detects fluid pressure changes in the fluid channel 132 at a first location and the second pressure sensor 160 detects fluid pressure changes in the fluid channel 132 at a second location different than the first location, as shown in FIG. 1. The pressure sensors 150, 160 preferably detect the input force 129 that is applied on a deformable region 126 in the expanded state, but may also or alternatively detect the input force 129 that is applied on a deformable region 126 in the retracted or recessed states. For example, in the variation in which the substrate 130 defines a support surface 138 that is concave, the user may apply a force 129 to the tactile surface 122 that inwardly deforms a particular deformable region 126 past flush with the undeformable region 128. When the user applies the input force 129 to the tactile surface 122, the fluid 110 is preferably prevented from escaping the fluid channel 132 (e.g., from either end of the fluid channel 132), such as by closing a valve 180 between the fluid channel 132 and displacement device 140 or by locking the position of the displacement device 140. Thus, the input force 129 that inwardly deforms the particular deformable region 126 also increases fluid pressure at the back surface 124 of the particular deformable region 126; the increase in fluid pressure is communicated through the associated fluid port 134 (or ports), through the fluid channel 132, and to the pressure sensors 150, 160.

The pressure sensors 150, 160 may be located adjacent to the back surface 124 of a deformable region 126, within a fluid port 134, and/or in the fluid channel 132. A portion of either pressure sensor 150 or 160 may be arranged within the substrate 130 or may be physically coextensive with the substrate 130. For example, the first pressure sensor 150 may include a diaphragm that is physically coextensive with the substrate 130 and forms a portion of a wall of the fluid channel 132 such that a fluid pressure change within the fluid channel 132 deforms the diaphragm (as shown in FIG. 8); this deformation preferably results in an output from the first pressure sensor 150. In this example, the diaphragm may be formed (such as by machining, etching, or molding) directly into the substrate 130. A portion of either pressure sensor 150 or 160 may also or alternatively be arranged on or within the tactile layer 120. For example, the first pressure sensor 150 may comprise a strain gage that is mounted on the back surface 124 of the tactile layer 120 at a deformable region 126; a force applied to the deformable region 126 in the expanded state produces an output, from the first pressure sensor 150, indicative of a strain at the deformable region 126. Furthermore, the variation of a pressure sensor that comprise a strain gauge may indirectly detect a pressure change within the fluid no by capturing a strain in any portion of the tactile layer 120 and/or the permeable layer 140. A strain captured by a pressure sensor is preferably indicative of a change in pressure within a portion of the fluid 110 (e.g., indicating a user touch on a deformable region 126), but such a strain may also be indicative of a user touch elsewhere on the tactile layer 120; the processor 170 preferably compares strains captured by a plurality of strain gauge pressure sensors to determine the particular location of such a user touch. However, the pressure sensors may be arranged anywhere else within the user interface system 100, may interface with any other element in any other way, and may be of any other type of sensor that directly or indirectly indicates a change in pressure within the fluid 110.

In the variation in which the fluid ports 134 communicate a portion of the fluid between the plurality of deformable regions 126 and the fluid channel 132, the pressure sensors are preferably coupled to the fluid channel 132. For example, the first pressure sensor 150 may be arranged substantially proximal to the first end of the fluid channel 132 and the second pressure sensor 160 may be arranged substantially proximal to the second end of the fluid channel 132. A third pressure sensor may also be coupled to the fluid channel 132 and arranged between the first and second pressure sensors 150, 160. In the variation that includes a valve 180 arranged between a fluid port 134 and the fluid channel 132 and which closes to prevent fluid flow out of the fluid port 134 and into the fluid channel 132, either of the first or second pressure sensors 150 or 160 is preferably located within the fluid port 134 or adjacent to the back surface 124 of the deformable region 126. A portion of each pressure sensor 150, 160 is preferably in direct contact with the portion of the fluid no within any of the fluid channel 132 or fluid ports 134 or at the back surface 124 of a deformable region 126; however, the pressure sensors 150, 160 may be substantially remote from the fluid channel 132 and fluid ports 134 such that the fluid 110 (and thus the fluid pressure and/or a pressure wave) is communicated to the pressure sensors via a fluid duct; such a fluid duct is preferably smaller in cross-sectional area than either of the fluid channel 132 and the fluid ports 134. However, the pressure sensors 150, 160 may be arranged at any other location and fluid pressure may be communicated to the pressure sensors 150, 160 via any other method, feature, or element.

The pressure sensors 150, 160 are preferably absolute pressure sensors, but may alternatively be differential pressure sensors in which the pressure sensors compare the pressure within a portion of the fluid to a reference pressure, such as ambient air pressure proximal to the user interface system 100. In the variation of the first pressure sensor 150 that is a differential pressure sensor taking ambient air pressure as the reference pressure, a feedback control loop between the displacement device 140 and the first pressure sensor 150 may be implemented such that fluid pressure within the fluid channel 132 is maintained substantially at ambient air pressure; in the retracted state, this preferably maintains the deformable regions 126 substantially flush with the undeformable region 128. This may be particularly useful when the user interface system 100 is taken to higher altitudes: as altitude increases, ambient air pressure decreases and the pressure at the back surface 124 of a deformable region 126 is preferably modified, via the control loop, to compensate for the change in ambient air pressure. The pressure sensors 150, 160 may be of any type, such as piezoresistive strain gauge, capacitive, electromagnetic, piezoelectric, optical, potentiometric, resonant, or thermal pressure sensors. The pressure sensors 150, 160 may also comprise or be replaced by flow meters, wherein the flow meters detect fluid flow within the user interface system 100 (e.g., the fluid channel 132 and/or the fluid ports 134) and the processor 170 analyzes the outputs of the flow meters to determine the location of an input force on the tactile layer 120. However, any other suitable arrangement or type of pressure sensor that detects a change in fluid pressure may be used, and the first and second pressure sensors 150, 160 need not be of the same type or form or arranged in similar ways within the user interface system 100. However, the processor 170 may analyze the output of only a single pressure sensor (such as the first pressure sensor iso) to determine the location of the input force on the tactile layer, such as via a method similar to that described in "TIME-REVERSAL FOR TEMPORAL COMPRESSION AND SPATIAL FOCUSING OF ACOUSTIC WAVES IN ENCLOSURES" by Deborah Berebichez, Ph.D., Stanford University, 2005, which is incorporated in its entirety by this reference.

7. The Valve

The user interface system 100 may further comprise a valve 180 operable between an open state, wherein the displacement device 140 displaces a portion of the fluid through the valve 180 to transition a deformable region 126 from the retracted state to the expanded state, as shown in FIG. 8; and a closed state, wherein the valve 180 substantially retains a portion of the fluid at the back surface 124 of the deformable region 126. The valve 180 preferably cooperates with the displacement device 140 to direct a portion of the fluid toward the back surface 124 of a deformable region 126 to expand the deformable region 126. In a first example, if a first deformable region 126 is to be expanded and a second deformable region 126 is to remain retracted, a first valve 180, arranged between the first deformable region 126 and the fluid channel 132 (e.g., along an associated fluid port 134), opens to allow a portion of the fluid to the back surface 124 of the first deformable region 126 while a second valve, arranged between the second deformable region 126 and the fluid channel 132, remains closed to prevent a change in the state of the second deformable region 126. In a second example, if the state of a first deformable region 126A is to be independent of a second deformable region 126B, a valve 180 may be arranged within the fluid channel 132 and between a fluid port associated with a first deformable region 126A and a fluid port associated with a second deformable region 126 such that the valve isolates the first deformable region 126A from the second deformable region 126B. To maintain a deformable region 126 in the expanded state, a valve 180 arranged between the expanded deformable region 126 and the fluid channel 132 may close to prevent fluid flow away from the back surface 124 of the deformable region 126. The valve 180 may be located: within the fluid channel 132, such as to isolate a first group of deformable regions 126 from a second group of deformable regions 126 (as shown in FIG. 13); at the first end of the fluid channel 132 to isolate control flow of the fluid between the fluid channel 132 and the displacement device 140 (as shown in FIG. 8); within a fluid port 134 to isolate a single deformable region 126 from the plurality of deformable regions 126; or at any other location.

The valve 180 may be any suitable type of valve 180, such as a ball, butterfly, check (i.e. one-way), diaphragm, knife, needle, pinch, plug, reed, or spool valve, or any other type of valve. The valve 180 may also be integral with the displacement device 140, such as a piston-type displacement device relying on a series of valves to control fluid flow therethrough.

The valve 180 may be of any size, but preferably defines a fluid gate of cross-sectional area substantially similar to the cross-sectional area of the fluid channel 132, fluid port 134, or other element to which the valve 180 is coupled. The valve 180 is also preferably electrically activated, such as by inducing a voltage differential across two input leads of the valve 180 to open and/or close the valve 180. The valve 180 is preferably normally in the closed state, but may also normally be in the open state or in any other state. The valve 180 preferably permits two-way flow but may alternatively be a one-way (e.g., check) valve. In the variation of the valve 180 that is a one-way valve normally permitting flow from a first side to a second side, the valve 180 may permit reverse fluid flow only given a fluid pressure at the second side substantially greater than the fluid pressure at the first side (or a fluid pressure at the second side greater than a given threshold pressure). In this variation, a user input of a substantially large force may increase pressure within a portion of the fluid no above a level that is not conducive to the safety or longevity of the user interface system 100 (or the electronic device 210 in which the user interface system 100 is implemented); such a valve 180, with a return threshold pressure, may open, given such high fluid pressure, to reduce fluid pressure within the channel and prolong the life of the user interface system 100 (or electronic device 210); such a valve may also or alternatively provide a "click" sensation to the user given an appropriate input in the tactile surface 122. This same feature may be implemented without such a one-way valve, such as by actively opening an electromechanical valve given a fluid pressure, detected by either pressure sensor 150 or 160, above a preset fluid pressure threshold. However, any other type of valve 180, number of valves, or arrangement of the valve(s) may be implemented in the user interface system 100.

8. The Display

The user interface system 100 may further comprise a display 200 generating an image that is transmitted through the tactile layer 120. The image is preferably aligned with at least one deformable region 126 of the plurality of deformable regions. The image preferably provides visual guidance to the user, such as by indicating the input type associated with an input force 129 applied to a particular deformable region 126. The display 200 is preferably coupled to the substrate 130 opposite the tactile surface 122. The display 200 may be joined to the substrate 130 via any of the methods or elements described above to join the tactile layer 120 to the substrate 130; however, the display 200 may also be clamped, suctioned, or statically adhered to the substrate 130, or joined thereto by any other means or method. The display 200 is preferably a digital display, such as an e-ink, LED, LCD, OLED, or plasma display. The display 200 may also be remote from the user interface system 100, wherein the image is projected onto and/or through the tactile surface 120. However, the display 200 may be any other type of display that renders an image that may be transmitted to the user via the substrate 130 and the tactile layer 120.

9. The Touch Sensor

The user interface system 100 may further comprise a touch sensor 190 that detects a user touch on the tactile surface 122 of the tactile layer 120. The touch sensor 190 may be of any form or function described in U.S. patent application Ser. No. 13/278,125 titled "User Interface System." The touch sensor 190 is preferably a capacitive touch sensor 190, but may also be an optical or resistive touch sensor 190 or function via any other technology. The touch sensor 190 is preferably physically coextensive with the display 200, but may also be interposed between the display 200 and the substrate 130 or between the substrate 130 and the tactile layer 120, or may be physically coextensive, in whole or in part, with any other element. The touch sensor 190 may also be arranged adjacent to the tactile layer 120 opposite the substrate 130, such as in the variation of the touch sensor 190 that is an optical touch sensor. The touch sensor 190 preferably compliments the pressure sensors 150, 160: the touch sensor 190 preferably detects a user touch 129 on the tactile surface 122 at the undeformable region 128 and the pressure sensors 150, 160 detect a user touch at the deformable regions 126. However, the touch sensor 190 may serve as the primary detection method for a touch 129 on a deformable region 126, and the pressure sensors 150, 160 may serve a backup or confirmation role in user input detection; however, the opposite may also be implemented. The touch sensor 190 may, however, be of any other type, arranged in any other location, and used in any other way to detect a user input 129 on the tactile surface 122.

10. The Processor

The processor 170 of the preferred embodiment functions to determine the location of a user input 129 to be at a particular deformable region 126. The processor 170 receives signals from the pressure sensors indicating detected changes in fluid pressure in the fluid channel 132, the fluid ports 134, and/or at the back surface 124 of the tactile layer 120 at one or more deformable regions 126. The processor 170 therefore cooperates with the pressure sensors 150, 160 to detect the presence of a force on the tactile surface 122 and to interpret the force to determine the input location; the processor 170 may also detect input magnitude, input speed, and/or input direction. The processor 170 preferably interprets the force based upon the detected pressure changes, the known locations of the pressure sensors 150, 160, the known locations of the deformable regions 126, the known location of an image rendered on the display 200 and aligned with a deformable region 126, and/or any other suitable information. The processor 170 may also communicate with additional sensors, such as a touch sensor 190 or a third pressure sensor, to determine the location of the user input.

In a first variation, the pressure sensors 150, 160 detect a fluid pressure change and the processor 170 interprets the presence of a user input 129 based upon the pressure change. The processor 170 preferably compares the detected pressure change to a pressure change threshold to determine whether the detected pressure change is indicative of a user input. By comparing the detected pressure change to the pressure change threshold, a proper input is preferably distinct from an improper input, such as the case of the user resting a finger or palm on the tactile surface 122, as action that is not intended to be a proper input. In a first example, the user unintentionally brushes a finger or palm against a particular deformable region 126, causing a substantially small pressure change within the fluid channel 132; this pressure change is detected by the pressure sensors 150, 160 but is still less than the threshold pressure change, so the processor 170 does not determine the pressure change to indicate a proper user input. In a second example, the user rests a finger on top of a particular deformable region 126 without intending to provide an input (this may be comparable to a user of a traditional keyboard resting a finger on a key without substantially depressing the key to generate an input); though this causes a change in pressure within the fluid channel 132, the detected pressure change, again, is not determined to be indicative of a proper input when compared against the threshold input pressure. However, if the detected pressure change is above the pressure change threshold, the processor 170 preferably determines a proper user input event. This provides a benefit over typical touch-sensitive displays (such as those utilizing capacitive sensing methods) that are often unable to differentiate between user touches of varying force (e.g., between a proper input and a user resting a finger on the display 200). The processor 170, therefore, is preferably able to discern between pressure changes that result from a finger resting on a particular deformable region 126 and a finger imparting a force resulting in a pressure change that is a proper input. The processor 170 may also adjust the pressure change threshold, such as for varying initial fluid pressures (e.g., the deformable regions 126 are raised to varying initial heights in the expanded state by adjusting the initial fluid pressure in the fluid channel 132). However, rather than compare fluid pressure changes (e.g., the magnitude of fluid pressure changes, the change rate of fluid pressure changes), the processor 170 may compare the absolute detected fluid pressure to an absolute pressure threshold; the processor 170 may also modify this absolute pressure threshold.

The processor 170 of the first variation may compare the length of time that the detected pressure change (or absolute detected pressure) is above a pressure change (or absolute pressure) threshold to a time threshold (or a combination of time and pressure change thresholds). In an example, the user initiates a user input by touching a particular deformable region 126 with a finger but changes his mind and quickly retracts a finger from the particular deformable region 126; this effectively "cancels" the input. Thus, if the length of time that the increased pressure is detected is below the threshold time, then the processor 170 preferably determines that a proper input was not provided and the input 129 is ignored. If the length of time that the increased pressure is detected is above the threshold time, then the processor 170 preferably determines the presence of a proper user input. However, the processor 170 and the pressure sensors 150, 160 may cooperate to determine the presence of a user input using any other suitable means and/or method.

In a second variation, the pressure sensors 150, 160 and the processor 170 cooperate to determine the type of a user input. In a first example, the pressure sensors 150, 160 detect the rate change of the fluid pressure in the fluid channel 132, which is proportional to the rate of the applied force on the tactile surface 122. The processor 170 determines the type of user input based upon the detected fluid pressure change rate; for example, a first fluid pressure change rate indicates a first input type and a second fluid pressure change rate less than the first fluid pressure change rate indicates a second input type. In a usage scenario, the input indicates a user desire to scroll through a document: a higher rate of pressure change requests a faster scroll rate and a lower rate of pressure change indicates a slower scroll rate (though this functionality may also be implemented by analyzing the magnitude of the fluid pressure or the magnitude of the change in fluid pressure rather than the fluid pressure change rate). (This usage scenario may also be applied to changing the brightness or contrast of the display 200 or the volume or processing speed of the electronic device.) In a second example, the pressure sensors 150, 160 detect the magnitude of the fluid pressure and the processor 170 determines the magnitude of the applied force based upon the magnitude of the fluid pressure, which is proportional to the magnitude of the applied force. Either pressure sensor 150 or 160 may thus function as an analog input for the electronic device 210, wherein the a varying force applied to a deformable region 126 results in a variable command, such as volume of a speaker or firing rate of a gun in a computer game. Similar to the first example, a first magnitude of fluid pressure change may indicate a first input type and a second magnitude of fluid pressure change may indicate a second input type. In a third example, a determined first length of time of an applied force may indicate a first input type and a second length of time of an applied force may indicate a second input type. In a usage scenario, the electronic device 210 is a camera with autofocus capability; the user "half-presses" a shutter button that is a deformable region 126, in the expanded state, to initiate autofocus; however, because the force required to "half-press" the button is relatively small, the detected force is not necessarily indicative of a user desire to initiate autofocus. In this usage scenario, the processor 170 determines the desire to initiate autofocus if the force (e.g., the change in fluid pressure) is detected over a particular period of time; in this usage scenario, the processor 170 may also detect the magnitude of the applied force (as described in the second example) to distinguish between a user desire to initiate the autofocus capability (a first input type) and a user desire to take a photo (a second input type). In a fourth example, the pressure sensors 150, 160 detect the distance by which the user inwardly deforms the particular deformable region 126 in the expanded state. The distance by which the user inwardly deforms the particular deformable region 126 may be detected by measuring the pressure and/or pressure change that results from the inward deformation of the expanded particular deformable region 126; specifically, the processor 170 may determine that a particular pressure and/or pressure change correlates to a particular distance by which the user inwardly deforms the particular deformable region 126. However, the processor 170 and the pressure sensors 150, 160 may cooperate to determine the type of user input by any other suitable method and/or means.

In a third variation, the pressure sensors 150, 160 and the processor 170 cooperate to determine the location of the user input. The third variation relies substantially on a fluidic property known in the field, wherein an increase in fluid pressure at a particular point in a fluid vessel (e.g., a fluid channel 132 or fluid port 134) propagates throughout the fluid vessel over time. The first pressure sensor 150 and the second pressure sensor 160 are preferably coupled to the fluid channel 132 (or other fluid vessel of the user interface system 100) at an appreciable distance from each other, as shown in FIGS. 1 and 8 (although the system may incorporate only a single pressure sensor). A change in fluid pressure (or absolute fluid pressure) is detected as a function of time at both the first and second pressure sensors 150, 160; the outputs of the first and second pressure sensors 150, 160 are preferably of the magnitude of the pressure change (or absolute pressure) relative to time, and a comparison of these two outputs preferably results in a determination of the location of the force 129 applied to the tactile surface 122 by the user. In a first variation, the first and second pressure sensors 150, 160 are located at different locations within a cavity defined by the fluid port 134 and the back surface 124 of an associated particular deformable region 126; the two pressure sensors 150, 160 and the processor 170 thus cooperate to determine the location of a user input along the particular deformable region 126. In a second variation, shown in FIG. 2, the pressure sensors 150, 160 are located at different locations within the fluid channel 132, such that the pressure sensors 150, 160 and the processor 170 cooperate to determine the location of a user input among various deformable regions 126 coupled to the fluid channel 132 via a plurality of fluid ports 134. In a first example, because an increase in pressure at a particular deformable region 126 requires more time to travel to the more distant of the first and second pressure sensors 150, 160, the processor 170 determines the location of a user input to be closer to the pressure sensor that detects a pressure change of a certain magnitude in the least amount of time; in this example, the processor 170 preferably determines the specific deformable region 126 upon which the input force 129 is applied. In a second example, because fluid pressure changes more rapidly at a location nearer the source of the pressure increase, the processor 170 determines that the location of the user input 129 is nearer to the pressure sensor that detects a higher rate of pressure change. In a third example, because fluid pressure in a fluid increases at a faster rate and reaches a higher maximum fluid pressure nearer the origin of the pressure increase, the processor 170 determines the location of the user input to be more proximal to the sensor that detects a higher fluid pressure after a particular time following a first detected change in fluid pressure (e.g., the application of the input force).

Figure 2:
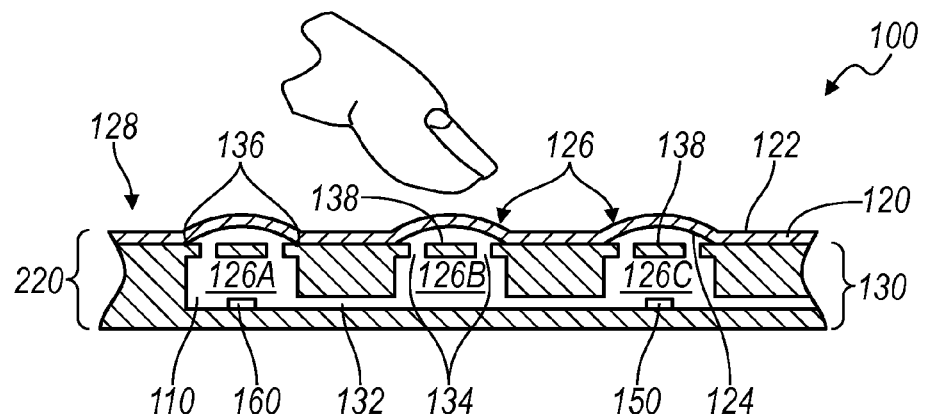
FIG. 2 is a cross-sectional elevation view illustrating operation of a button array in accordance with the preferred embodiment.
Figure 3:
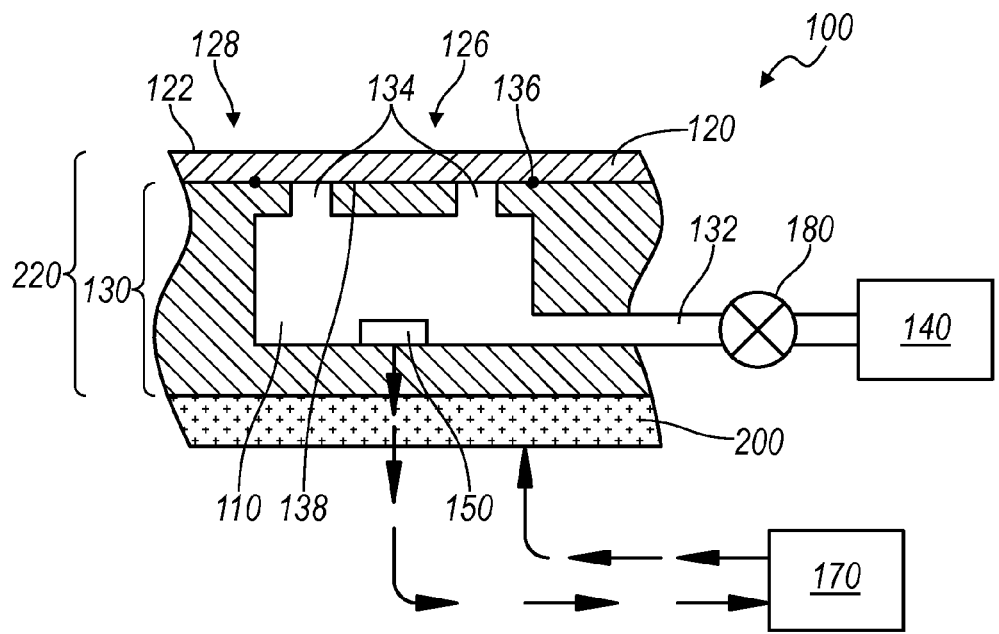
FIG. 3 is a cross-sectional view of the tactile layer, substrate, first pressure sensor, second pressure sensor, displacement device, processor, and display of the preferred embodiment.

In a fourth variation, the pressure sensors 150, 160 are located within the fluid channel 132 and detect fluid pressure changes therein, as shown in FIGS. 2 and 7. The fluid channel 132 is preferably of a substantially uniform cross-section and of a known length. Additionally, in the variation of the fluid channel 132 shown in FIG. 7 and the channel arrangement shown in FIG. 1, the volume of fluid 110 within the fluid ports 134 is preferably small relative to the volume of fluid 110 contained within the fluid channel 132; the flow of the fluid 110 through the fluid channel 132 may thus be substantially unaffected by fluid flow through any of the fluid ports 134. Furthermore, data including the location of the pressure sensors 150, 160 and the length of the fluid channel 132 is preferably available to the processor 170 such that standard in-tube fluid flow dynamics may be used to determine the location of a user input 129 provided on a deformable region 126. For example, as a portion of the fluid 110 is displaced through the fluid channel 132 as a result of the force 129 applied by the user, the time at which a change in pressure is detected at the pressure sensors 150, 160 and may used to determine where, within the fluid channel 132, the fluid pressure first increases. More specifically, for a fluid of a known viscosity traveling through a tube of a known cross-section, the time difference between when a change in pressure is detected by the first pressure sensor 150 and when the change in pressure is detected by the second pressure sensor 160 may be used by the processor 170 to pinpoint the location of the initial pressure increase within the fluid channel 132, such as relative to the first and second pressure sensors 150, 160; this location is preferably associated with the location of a fluid port 134 and/or the particular deformable region 126 associated with the fluid port 134.

In the above variations, the processor 170 preferably interprets data provided by the first and second pressure sensors 150, 160 at a particular time; the processor 170 may determine the location of the user touch by comparing the data gathered by the first and second pressure sensors 150, 160. Generally, the processor 170 may compare the magnitude of the pressure change (in the first variation), the magnitude of the rate of change (in the second variation), the time of the detected pressure change (in the third and fourth variations), or any other suitable data detected by the first and second pressure sensors 150, 160 and pertinent to determining the location of the user input 129. Alternatively, the processor 170 may determine the location of the user touch 129 by comparing data gathered by the first and second pressure sensors 150, 160 to a dataset. For example, the dataset may be a table or library of pressure-related readings that indicate the location of a pressure increase given particular outputs from the first and/or second pressure sensors 150, 160; this preferably indicates the particular deformed region to which the input force 129 is applied. In the example arrangement shown in FIG. 2, a user input at a deformable region 126C preferably results in comparison of pressure readings at the first and second sensors 150, 160 that is different than a pressure reading comparison resulting from a user input at a deformable region 126B; the processor 170 determines the input based on these comparisons. This method of determining the location of the user input may also facilitate determining locations of user inputs that are provided on the tactile surface 122 simultaneously. For example, in the arrangement shown in FIG. 2, simultaneous user inputs provided at deformable region 126A and deformable region 126B preferably result in a comparison of pressure readings (at the first and second pressure sensors 150, 160) that is different than a pressure reading comparison resulting from simultaneous user inputs provided at deformable region 126B and deformable region 126C; both such pressure reading comparisons are preferably different than the pressure reading comparison resulting from a single user input provided at deformable region 126A. Preferably, each deformable region 126 has a distinct input characteristic, such as a distinct time period over which an input force applied on a deformable region 126 is transmitted, as a fluid pressure change, from the deformable region 126 to a pressure sensor(s) 150 or 160 in terms of time differences. This preferably permits determination of multiple input locations attributed to multiple simultaneous input forces at a plurality of deformable regions 126; specifically, this preferably allows the processor 170 to resolve multiple input locations at once by looking at the combination of pressure signals at each sensor 150, 160. Furthermore, the processor 170 may take into account one or more previous input force locations and or relevant timing of previous input forces when determining a more recent input location. The number of pressure sensors and deformable regions is preferably chosen to ensure that each deformable region has such a unique characteristic.

In the variation of the deformable region 126 that functions as a slider or a pointing stick, as the user varies the location of the user input along the slider or the direction of the input on the pointing stick, the pressure detected by the first and second pressure sensors 150, 160 may be compared to a data set that includes pressure readings expected for such applied inputs. However, the dataset may include any suitable type of data against which the processor 170 may: compare data gathered from the pressure sensors 150, 160; and determine the location of a user input 129 (or a plurality of simultaneous user inputs). This method is particularly useful in a device in which the specific locations of user inputs on deformable regions must be predicted; in such a device, the pressure sensors 150, 160 may be the only sensors necessary to detect relevant details (e.g., location and magnitude) of the user input 129, and this preferably decreases the number and complexity of sensors in the device. However, any number of pressure sensors may be incorporated into the user interface system 100 and any other suitable method for determining the location of the user input 129 may be used. The processor may also compare the outputs of any number and/or combination of pressure sensors within the user interface system 100.

The pressure sensors 150, 160 and the processor 170 may also enhance the performance of the user interface system 100 or the electronic device 210 in which the user interface system 100 is implemented. For example, the processor 170 may determine that the detected pressure within the fluid channel 132 is lower than a predetermined threshold (such as for more than a threshold period of time) and may actuate the displacement device 140 to displace additional fluid into the fluid channel 132. Alternatively, the pressure sensors 150, 160 may detect the ambient air temperature; the processor 170 may, in turn, determine that the ambient temperature has decreased and thus actuate the displacement device 140 to displace fluid out of the fluid channel 132 to decrease the fluid pressure within the fluid channel 132 in order to protect the user interface system 100 from damage, such as from excessive internal pressures. However, the pressure sensors 150, 160 and processor 170 may alternatively cooperate to perform any other suitable function.

11. The Method

Figure 14:
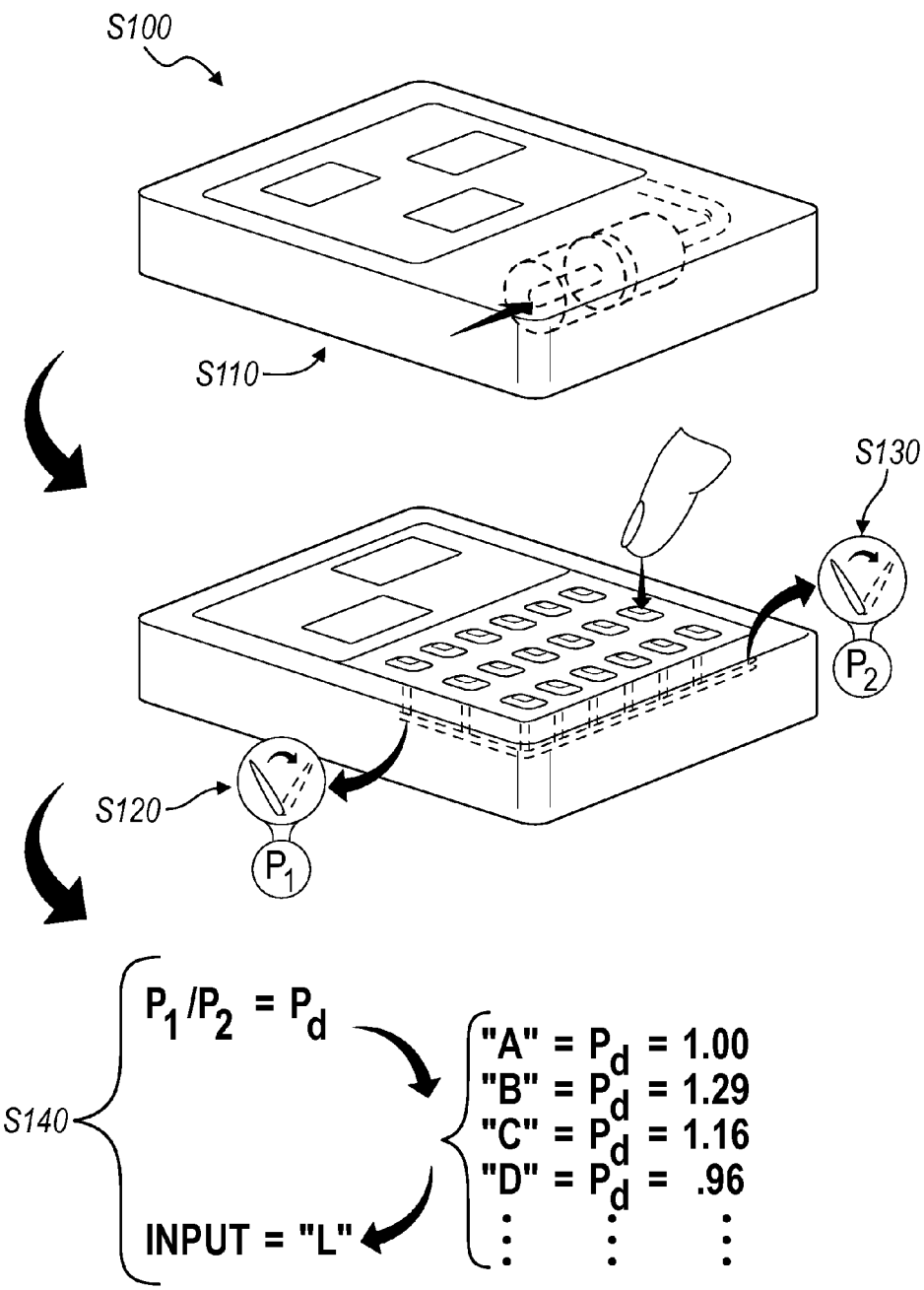
FIG. 14 is a flowchart of the steps of a method of the preferred embodiment.

As shown in FIG. 14, the method S100 of the preferred embodiment functions to determine an input location on a tactile surface of the user interface system 100. The steps include: displacing fluid through a fluid channel and a series of fluid ports to outwardly deform a plurality of deformable regions of a tactile layer S110; detecting a change in fluid pressure at a first location within the fluid channel due to an input force applied to the tactile surface at a particular deformable region S120; detecting a change in fluid pressure at a second location within the fluid channel due to the input force applied to the tactile surface S130; and selecting the particular deformable region, from the plurality of deformable regions, as the input location based upon a comparison of the changes in fluid pressure detected at the first and second locations within the fluid channel S140. The step of displacing the fluid through the fluid channel S110 is preferably performed by a displacement device, as described above. The steps of detecting the fluid pressure changes at the first and second locations within the fluid channel S120, S130 are preferably performed by the first and second pressure sensors described above. The step of selecting the particular deformable region S140 is preferably performed, by the processor, via the methods describes above.

As a person skilled in the art will recognize from the previous detailed description and from the figures and claims, modifications and changes can be made to the preferred embodiments of the invention without departing from the scope of this invention defined in the following claims.

We claim:

1. A user interface system comprising:
   a substrate defining a fluid channel comprising a first end and a second end, the fluid channel fluidly coupled to a set of cavities between the first end and the second end;
   a tactile layer comprising a tactile surface, a peripheral region coupled to the substrate, and a set of deformable regions adjacent the peripheral region, each deformable region in the set of deformable regions cooperating with the substrate to define a corresponding cavity in the set of cavities;
   a displacement device configured to displace fluid through the fluid channel and into the set of cavities to transition the set of deformable regions from a retracted setting to an expanded setting, the set of deformable regions substantially flush with the peripheral region in the retracted setting and tactilely distinguishable from the peripheral region in the expanded setting;
   a first pressure sensor fluidly coupled to the fluid channel proximal the first end;
   a second pressure sensor fluidly coupled to the fluid channel proximal the second end, the second pressure sensor discrete from the first pressure sensor; and
   a processor configured to determine selection of a particular deformable region in the set of deformable regions in the expanded setting based upon a comparison of a first signal from the first pressure sensor and a second signal from the second pressure sensor.

2. The user interface system of claim 1, wherein a portion of the first pressure sensor is arranged within the substrate.

3. An electronic device incorporating the user interface system of claim 1, wherein the electronic device is selected from the group consisting of an automotive console, a desktop computer, a laptop computer, a tablet computer, a television, a radio, a desk phone, a mobile phone, a PDA, a personal navigation device, a personal media player, a camera, a gaming console and controller, a remote control, and a watch.

4. The user interface system of claim 1, wherein the first pressure sensor outputs the first signal corresponding to a fluid pressure change proximal the first end of the fluid channel, wherein the second pressure sensor outputs the second signal corresponding to a fluid pressure change proximal the second end of the fluid channel, and wherein the processor estimates an origin of a pressure wave within the fluid channel based on a comparison of the first signal and the second signal and to identify the particular deformable region corresponding to the origin of the pressure wave.

5. The user interface system of claim 4, wherein the processor calculates a first fluid pressure change rate in the first signal and a second fluid pressure change rate in the second signal and estimates the origin of the pressure wave within the fluid channel based on a difference between the first fluid pressure change rate and the second fluid pressure change rate over time.

6. The user interface system of claim 1, wherein the processor determines a maximum pressure within the fluid channel based on the first signal, characterizes the input on the particular deformable region as a first input type in response to the maximum pressure within the fluid channel that falls below a threshold pressure, and characterizes the input on the particular deformable region as a second input type in response to the maximum pressure within the fluid channel that exceeds the threshold pressure.

7. The user interface system of claim 1, wherein the processor determines a fluid pressure within the fluid channel based on the first signal, characterizes the input on the articular deformable region as a first input type in response to the fluid pressure within the fluid channel exceeding a threshold fluid pressure for a first period of time, characterizes the input on the particular deformable region as a first input type in response to the fluid pressure within the fluid channel exceeding the threshold fluid pressure for a second period of time.

8. The user interface system of claim 1, wherein the displacement device is coupled to the first end of the fluid channel, and wherein the second end of the fluid channel is closed.

9. The user interface system of claim 8, further comprising a valve arranged within the fluid channel and operable between an open state and a closed state, the valve in the open state when the set of deformable regions transition from the retracted setting into the expanded setting, the valve in the closed state to maintain the set of deformable regions in the expanded setting.

10. The user interface system of claim 1, wherein the substrate defines the fluid channel that comprises a serpentine channel.

11. The user interface system of claim 1, wherein the substrate defines a planar surface adjacent the tactile layer and defines the fluid channel that communicates fluid through the substrate in a direction substantially parallel to the planar surface.

12. The user interface system of claim 11, wherein the substrate defines a set of fluid ports, each fluid port configured to communicate from the fluid channel into a corresponding cavity in a direction substantially normal to the planar surface.

13. The user interface system of claim 12, wherein the substrate comprises a first sub-layer joined to a second sublayer, the first sub-layer defining an elongated pocket, the second sublayer enclosing the elongated pocket to define the fluid channel and defining a plurality of through-bores intersecting the elongated pocket to define the set of fluid ports.

14. The user interface system of claim 1, wherein the first pressure sensor is arranged within the substrate.

15. The user interface system of claim 1, wherein, in the retracted setting, the processor controls the displacement device to substantially match a fluid pressure within the fluid channel to a measured ambient air pressure.

16. The user interface system of claim 1, further comprising a capacitive touch sensor coupled to the substrate, the processor configured to detect an input on the peripheral region based on an output of the touch sensor.

17. The user interface system of claim 16, wherein the processor is configured to detect an input on a deformable region in the set of deformable regions in the retracted setting based on an output of the touch sensor.

18. The user interface system of claim 1, further comprising a display coupled to the substrate opposite the tactile layer and configured to output an image through the substrate and the tactile layer.

19. The user interface system of claim 18, wherein the image is substantially aligned with a deformable region in the set of deformable regions.

20. The user interface system of claim 18, wherein the substrate and the tactile layer are substantially transparent.

21. The user interface system of claim 18, wherein the display is configured to output a set of images comprising the image, each image in the set of images defining an alphanumeric character and substantially aligned with a corresponding deformable region in the set of deformable regions in the expanded setting.

22. The user interface system of claim 1, wherein the substrate defines a set of support members, each support member adjacent a corresponding deformable region in the set of deformable regions and configured to limit deformation of the corresponding deformable region inward toward the substrate.

23. The user interface of claim 22, wherein each support member in the set of support members is configured to resist deformation of the corresponding deformable region inward passed flush with the peripheral region.

24. A method for detecting an input into a user interface system, comprising:

displacing fluid into a fluid channel to transition a set of deformable regions of a tactile layer from a retracted setting to an expanded setting, each deformable region in the set of deformable regions substantially flush with a peripheral region in the retracted setting and tactilely distinguishable from the peripheral region in the expanded setting and cooperating with a substrate to define a corresponding cavity in a set of cavities, each cavity in the set of cavities fluidly coupled to the fluid channel between a first end of the fluid channel and a second end of the fluid channel, and the tactile layer defining the peripheral region adjacent the set of deformable regions and coupled to the substrate;

with a first pressure sensor, detecting a first change in fluid pressure within the fluid channel proximal the first end of the fluid channel;

with a second pressure discrete from the first pressure sensor, detecting a second change in fluid pressure within the fluid channel proximal the second end of the fluid channel;

estimating an origin of a pressure change within the fluid channel based on a comparison of the first change in fluid pressure and the second change in fluid pressure; and correlating the origin of the pressure change within the fluid channel with an input on a particular deformable region, in the set of deformable regions in the expanded setting.

25. The method of claim 24, wherein estimating the origin of the pressure change within the fluid channel comprises correlating the first change in fluid pressure with a pressure wave moving in a first direction within the fluid channel, correlating the second change in fluid pressure with the pressure wave moving in a second direction within the fluid channel, and determining an origin of the pressure wave within the fluid channel based on a detected time of the first pressure wave, a detected time of the second pressure wave, and a dimension of the fluid channel.

26. The method of claim 24, wherein detecting the first change in fluid pressure within the fluid channel comprises detecting a fluid pressure change rate proximal the first end of the fluid channel, and further comprising correlating the input on the particular deformable region with a first input type for the fluid pressure change rate that falls below a threshold fluid pressure change rate and correlating the input on the particular deformable region with a second input type for the fluid pressure change rate that exceeds the threshold fluid pressure change rate.

27. The method of claim 24, wherein detecting the first change in fluid pressure within the fluid channel comprises detecting a maximum fluid pressure proximal the first end of the fluid channel, and further comprising correlating the input on the particular deformable region with a first input type for a maximum detected fluid pressure within the fluid channel that falls below a threshold maximum detected fluid pressure and correlating the input particular deformable region with a second input type for the maximum detected fluid pressure that exceeds the threshold maximum detected fluid pressure.

* * * * *